US012642745B2

(12) United States Patent
Coon et al.

(10) Patent No.: US 12,642,745 B2
(45) Date of Patent: Jun. 2, 2026

(54) PHARMACEUTICAL CONTAINERS COMPRISING NECKS WITH NON-UNIFORM OUTER SURFACES AND METHODS REGARDING THE SAME

(71) Applicant: CORNING INCORPORATED, Corning, NY (US)

(72) Inventors: Jeffrey Coon, Corning, NY (US); Steven Edward DeMartino, Painted Post, NY (US); Connor Thomas O'Malley, Painted Post, NY (US); Robert Anthony Schaut, Horseheads, NY (US); Brett Christopher Shelton, Corning, NY (US); James Ernest Webb, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 117 days.

(21) Appl. No.: 18/292,211

(22) PCT Filed: Jul. 14, 2022

(86) PCT No.: PCT/US2022/037043
    § 371 (c)(1),
    (2) Date: Jan. 25, 2024

(87) PCT Pub. No.: WO2023/009321
    PCT Pub. Date: Feb. 2, 2023

(65) Prior Publication Data
    US 2024/0358592 A1     Oct. 31, 2024

Related U.S. Application Data

(60) Provisional application No. 63/203,571, filed on Jul. 27, 2021.

(51) Int. Cl.
    *A61J 1/14*          (2023.01)
    *B65B 7/28*          (2006.01)
    (Continued)

(52) U.S. Cl.
    CPC ........... *A61J 1/1468* (2015.05); *B65B 7/2821* (2013.01); *B65D 1/023* (2013.01); *B65D 23/0814* (2013.01); *C03C 17/005* (2013.01)

(58) Field of Classification Search
    CPC ...... A61J 1/1468; B65D 1/023; B65B 7/2821; B65B 2439/60
    (Continued)

(56) References Cited

U.S. PATENT DOCUMENTS

| 3,653,528 A | 4/1972 | Wimmer |
| 3,659,736 A | 5/1972 | Riggs |
(Continued)

FOREIGN PATENT DOCUMENTS

| CA | 3138450 A1 | 11/2020 |
| CN | 1946612 A | 4/2007 |
(Continued)

OTHER PUBLICATIONS

International Search Report and Written Opinion of the International Searching Authority; PCT/US2024/029817; dated Sep. 25, 2024; 12 pages; European Patent Office.
(Continued)

*Primary Examiner* — Ernesto A Grano
(74) *Attorney, Agent, or Firm* — Michael G. Panian

(57) ABSTRACT

A pharmaceutical container comprises a glass body enclosing an interior volume of the pharmaceutical container. The glass body comprises a central axis extending through a geometric center of the interior volume, a wall thickness extending between an inner surface and an outer surface, a flange comprising an underside surface, a shoulder, and a
(Continued)

neck extending between the flange and the shoulder. Within at least a portion of the neck, the outer surface extends inward toward the central axis such that at least a sloped portion of the outer surface is sloped inward towards the central axis adjacent the flange.

17 Claims, 15 Drawing Sheets

(51) Int. Cl.
*B65D 1/02* (2006.01)
*B65D 23/08* (2006.01)
*C03C 17/00* (2006.01)

(58) Field of Classification Search
USPC .......................................................... 215/370
See application file for complete search history.

(56) References Cited

U.S. PATENT DOCUMENTS

| | | | |
|---|---|---|---|
| 4,089,432 A | 5/1978 | Crankshaw et al. | |
| 4,205,754 A | 6/1980 | Jarsskov et al. | |
| 4,244,478 A | 1/1981 | Handman | |
| 4,664,277 A | 5/1987 | Connor | |
| 5,064,083 A | 11/1991 | Alexander et al. | |
| 5,772,057 A | 6/1998 | Finneran | |
| 5,803,284 A | 9/1998 | Grimard | |
| 5,817,082 A | 10/1998 | Niedospial et al. | |
| 5,902,298 A * | 5/1999 | Niedospial, Jr. ..... | B65D 51/002 |
| | | | 215/247 |
| 6,090,093 A | 7/2000 | Thibault et al. | |
| 6,602,206 B1 | 8/2003 | Niermann et al. | |
| 6,645,635 B2 | 11/2003 | Muraki | |
| 7,282,269 B2 | 10/2007 | Wang et al. | |
| 8,092,878 B2 | 1/2012 | Miller et al. | |
| 8,497,004 B2 | 7/2013 | Davis et al. | |
| 8,544,665 B2 | 10/2013 | Bogle et al. | |
| 8,551,898 B2 | 10/2013 | Danielson et al. | |
| 8,684,206 B2 | 4/2014 | Kawachi | |
| 9,080,044 B2 | 7/2015 | Muto | |
| 9,145,329 B2 | 9/2015 | Drake et al. | |
| 9,744,099 B2 | 8/2017 | Fadeev et al. | |
| 9,763,852 B2 | 9/2017 | Fadeev et al. | |
| 10,273,049 B2 | 4/2019 | Adib et al. | |
| 10,450,214 B2 | 10/2019 | Mcenroe et al. | |
| 10,780,021 B2 | 9/2020 | Weikart et al. | |
| 11,168,019 B2 | 11/2021 | Schaut et al. | |
| 11,376,191 B2 * | 7/2022 | Langsdorf ............. | C03B 23/099 |
| 2002/0023409 A1 | 2/2002 | Py | |
| 2002/0166326 A1 | 11/2002 | Giesy et al. | |
| 2003/0177629 A1 | 9/2003 | Thibault et al. | |
| 2004/0217081 A1 | 11/2004 | Konrad | |
| 2007/0102393 A1 | 5/2007 | Colin et al. | |
| 2007/0246468 A1 | 10/2007 | Miller et al. | |
| 2008/0041808 A1 | 2/2008 | Smith et al. | |
| 2009/0145427 A1 | 6/2009 | Groeger et al. | |
| 2010/0236659 A1 | 9/2010 | Py et al. | |
| 2010/0273049 A1 | 10/2010 | Vidal et al. | |
| 2014/0151370 A1 * | 6/2014 | Chang ..................... | C03C 17/30 |
| | | | 220/62.15 |
| 2015/0211950 A1 | 7/2015 | Eckhoff et al. | |
| 2015/0344557 A1 | 12/2015 | Malik et al. | |
| 2016/0009460 A1 | 1/2016 | Fournier et al. | |
| 2016/0075485 A1 | 3/2016 | Masuyama et al. | |
| 2016/0324723 A1 | 11/2016 | Lippert et al. | |
| 2018/0257975 A1 | 9/2018 | Kimura et al. | |
| 2020/0146280 A1 | 5/2020 | Silverman et al. | |
| 2020/0156991 A1 | 5/2020 | Allington et al. | |
| 2020/0271541 A1 * | 8/2020 | Mathaes ............... | G01M 3/229 |
| 2020/0399165 A1 * | 12/2020 | Frost .................. | C03C 23/0075 |
| 2021/0000690 A1 | 1/2021 | Langsdorf et al. | |
| 2021/0002016 A1 * | 1/2021 | Langsdorf ............. | B65D 1/023 |
| 2021/0080448 A1 | 3/2021 | Murphy et al. | |

| | | | |
|---|---|---|---|
| 2021/0188687 A1 * | 6/2021 | Frost ....................... | A61J 1/065 |
| 2021/0212893 A1 | 7/2021 | Christie et al. | |
| 2022/0048804 A1 | 2/2022 | Barnard et al. | |
| 2022/0168185 A1 * | 6/2022 | Redkar ................... | A61J 1/065 |
| 2022/0339067 A1 * | 10/2022 | Christie ................ | B65B 7/2821 |
| 2022/0409484 A1 * | 12/2022 | Evans, II ............. | A61K 39/099 |
| 2023/0157927 A1 * | 5/2023 | Christie ................ | B65B 7/2821 |
| | | | 53/471 |
| 2023/0277693 A1 * | 9/2023 | Witham ............. | A61K 49/0043 |
| | | | 424/9.6 |

FOREIGN PATENT DOCUMENTS

| | | |
|---|---|---|
| CN | 101287553 A | 10/2008 |
| CN | 112173335 A | 1/2021 |
| CN | 113165961 A | 7/2021 |
| EP | 0267433 A2 | 5/1988 |
| EP | 3708137 A1 | 9/2020 |
| FR | 0484903 A | 11/1917 |
| FR | 2558444 A1 | 7/1985 |
| JP | 10-179688 A | 7/1998 |
| JP | 2002-065811 A | 3/2002 |
| JP | 2010-209157 A | 9/2010 |
| WO | 2013/034594 A1 | 3/2013 |
| WO | 2019/213746 A1 | 11/2019 |
| WO | 2020/112634 A1 | 6/2020 |
| WO | 2020/231474 A2 | 11/2020 |
| WO | 2021/042090 A2 | 3/2021 |
| WO | 2021/162984 A1 | 8/2021 |
| WO | 2022/020120 A1 | 1/2022 |
| WO | 2023/034088 A1 | 3/2023 |

OTHER PUBLICATIONS

"Circular Rings and Arches", Retrieved from: https://engineeringlibrary.org/reference/circular-rings-arches-air-force-stress-manual, 1986, 15 pages.

"Emission Factors for Greenhouse Gas Inventories", Retrieved from: https://www.epa.gov/sites/default/files/2018-03/documents/emission-factors_mar_2018_0.pdf, 2018, 5 pages.

"How Much Does an Empty Semi Trailer Weigh?", Retrived from: https://bigrigpros.com/how-much-does-an-empty-semi-trailer-weigh/, 2023, 5 pages.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

Brigitte Zuleger et al., Container/Closure Integrity Testing and the Identification of a Suitable Vial/Stopper Combination for Low-Temperature Storage at −80° C., 2012, PDA JPST, vol. 66, Abstract (Year: 2012).

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Ethylene-Propylene Rubbers & Elastomers, Apr. 20, 2012, International Institute of Synthetic Rubber Producers, Inc. (Year: 2012).

Hagart-Alexander, C., Temperature Measurement, 2010, Elsevier Inc., pp. 269-271 (Year: 2010).

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

International Search Report and Written Opinion of the International Searching Authority; PCT/US22/37043; mailed on Nov. 3, 2022, 15 pages; European Patent Office.

Mathaes, R., et al. (2016). "The pharmaceutical vial capping process: Container closure systems, capping equipment, regulatory framework, and seal quality tests", ELSEVIER, Eur J Pharm Biopharm 99 (2016) 54-64. DOI: http://dx.doi.org/10.1016/j.ejpb.2015.11.016.

Nieto, A. and H. Roehl (2018). "Sealing Behaviour of Container Closure Systems under Frozen Storage Conditions: Nonlinear Finite

(56)     References Cited

OTHER PUBLICATIONS

Element Simulation of Serum Rubber Stoppers." PDA J Pharm Sci and Tech (2018), 72(4): 367-381. DOI: 10.5731/pdajpst.2017. 008391.

Shigley and Mitchell, Mechanical Engineering Design 4th edition, 1985, 6 pages.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

Chinese Patent Application No. 202280053117.9 , Office Action dated Oct. 24, 2025, 5 pages (English Translation only), Chinese Patent Office.

\* cited by examiner

PHARMACEUTICAL CONTAINERS COMPRISING NECKS WITH NON-UNIFORM OUTER SURFACES AND METHODS REGARDING THE SAME

CROSS-REFERENCE TO RELATED APPLICATIONS

This is a national stage application under 35 U.S.C. § 371 of International Application No. PCT/US2022/037043, filed Jul. 14, 2022, which claims the benefit of priority under 35 U.S.C. § 119 of U.S. Provisional Application Ser. No. 63/203,571 filed on Jul. 27, 2021, the content of which are relied upon and incorporated herein by reference in their entirety.

FIELD

The present specification generally relates to glass containers for storing pharmaceutical compositions.

TECHNICAL BACKGROUND

Pharmaceutical containers, such as vials, are typically sealed via a stopper or other closure to preserve the integrity of the contained material. Closures are typically made of synthetic rubbers and other elastomers. A closure may be, for example, compressed against a flange of a vial to form a seal between the vial and the flange. Such compression may be achieved by crimping a metallic cap around the flange to maintain the closure in a state of compression on the flange and form a high integrity seal. Crimping may be achieved by capping tools that contact the metallic cap to bend a portion of the metallic cap around the flange. Capping systems may use common configurations (e.g., the same capping tools, similar movement sequences for the capping tools) for containers having different sizes. As a result, the capping tools may contact different portions of the containers, leading to different capping stresses. In some cases, such capping stresses may lead to defects in the container that are difficult to detect and may potentially cause failure of the container or contamination of the contained material.

SUMMARY

A first aspect of the present disclosure includes a pharmaceutical container comprising a glass body enclosing an interior volume of the pharmaceutical container, the glass body comprising: a central axis extending through a geometric center of the interior volume; a wall thickness extending between an inner surface and an outer surface; a flange comprising an underside surface; a shoulder; and a neck extending between the flange and the shoulder, wherein, within at least a portion of the neck, the outer surface extends inward toward the central axis such that at least a sloped portion of the outer surface is sloped inward towards the central axis adjacent the flange.

A second aspect of the present disclosure includes a pharmaceutical container according to the first aspect, wherein the outer surface extends inward towards the central axis such that the wall thickness decreases within the neck with decreasing distance from the underside surface.

A third aspect of the present disclosure includes a pharmaceutical container according to any of the first through the second aspects, wherein: the outer surface comprises a first transition region extending between the neck and the underside surface, and at least a portion of the first transition region is disposed radially inward of an outer portion of the outer surface within the neck that is most radially distant from the central axis.

A fourth aspect of the present disclosure includes a pharmaceutical container according to any of the first through the third aspects, wherein the outer portion of the outer surface within the neck that is most radially distant from the central axis is disposed at least 1 mm beneath the underside surface of the flange.

A fifth aspect of the present disclosure includes a pharmaceutical container according to any of the first through the fourth aspects, wherein, within the sloped portion, the outer surface extends radially inward toward the central axis by at least a radial distance of 0.2 mm.

A sixth aspect of the present disclosure includes a pharmaceutical container according to any of the first through the fifth aspects, wherein: within the neck, the outer surface comprises a second transition region, and in the second transition region, the outer surface extends inward toward the central axis.

A seventh aspect of the present disclosure includes a pharmaceutical container according to any of the first through the sixth aspects, wherein, within the second transition region, the outer surface follows a contour having a radius of curvature that is greater than that of the first transition region.

An eighth aspect of the present disclosure includes a pharmaceutical container according to any of the first through the seventh aspects, further comprising a lubricous coating positioned around at least a portion of the outer surface.

A ninth aspect of the present disclosure includes a pharmaceutical container according to any of the first through the eighth aspects, wherein: the lubricous coating is disposed on at least a portion of the outer surface at the neck, and the outer surface extends inward toward the central axis within a region of the neck that does not comprise the lubricous coating.

A tenth aspect of the present disclosure includes a pharmaceutical container according to any of the first through the ninth aspects, wherein, within the neck, the outer surface comprises: a first portion extending from the shoulder; and an upper portion extending between the first portion and the flange, wherein, within the upper portion, the wall thickness decreases with increasing distance from the shoulder.

An eleventh aspect of the present disclosure includes a pharmaceutical container according to any of the first through the tenth aspects, wherein a lower edge of the upper portion is disposed at least 2.0 mm beneath the underside surface of the flange.

A twelfth aspect of the present disclosure includes a pharmaceutical container according to any of the first through the eleventh aspects, wherein a lower edge of the upper portion is disposed at least 3.0 mm beneath the underside surface of the flange.

A thirteenth aspect of the present disclosure includes a pharmaceutical container according to any of the first through the second aspects, wherein: the upper portion comprises a taper, and within the taper, the wall thickness linearly decreases with increasing distance from the shoulder.

A fourteenth aspect of the present disclosure includes a pharmaceutical container according to any of the first through the thirteenth aspects, wherein: the upper portion comprises an undercut, and within the undercut, the wall thickness non-linearly decreases with increasing distance from the shoulder.

A fifteenth aspect of the present disclosure includes a pharmaceutical container according to any of the first through the fourteenth aspects, wherein the glass body forms a vial having a volume that is greater than or equal to 1.0 ml and less than or equal to 30 ml.

A sixteenth aspect of the present disclosure includes a pharmaceutical container comprising: a glass body enclosing an interior volume of the pharmaceutical container, the glass body comprising: a central axis extending through a geometric center of the interior volume; a wall thickness extending between an inner surface and an outer surface; a flange; a shoulder; and a neck extending between the flange and the shoulder, wherein: within the neck, the outer surface comprises an upper portion where a radial distance between the outer surface and the central axis varies as a function of axial proximity to the flange.

A seventeenth aspect of the present disclosure includes a pharmaceutical container according to the sixteenth aspect, wherein: within the neck, the outer surface comprises a first portion extending between the shoulder and the upper portion, and within the upper portion, the outer surface is sloped inward towards the central axis.

An eighteenth aspect of the present disclosure includes a pharmaceutical container according to any of the sixteenth to the seventeenth aspects, wherein, within the upper portion, the outer surface extends radially inward toward the central axis by at least a radial distance of 0.2 mm.

An nineteenth aspect of the present disclosure includes a pharmaceutical container according to any of the sixteenth to the eighteenth aspects, wherein: within the upper portion, the outer surface comprises a taper; and within the taper, the radial distance between the outer surface and the central axis decreases linearly with increasing distance from the shoulder.

A twentieth aspect of the present disclosure includes a pharmaceutical container according to any of the sixteenth to the nineteenth aspects, wherein: within the upper portion, the outer surface comprises an undercut; and within the undercut, the radial distance between the outer surface and the central axis decreases non-linearly with increasing distance from the shoulder.

A twenty first aspect of the present disclosure includes a pharmaceutical container according to any of the sixteenth to the twentieth aspects, wherein the undercut comprises a circular arc.

A twenty second aspect of the present disclosure includes a pharmaceutical container according to any of the sixteenth to the twenty first aspects, wherein: the outer surface comprises a transition region disposed between the neck and the flange, and the circular arc comprises a radius of curvature that is greater than that of the transition region.

A twenty third aspect of the present disclosure includes a pharmaceutical container according to any of the sixteenth to the twenty second aspects, wherein a lower edge of the upper portion is disposed at least 2.0 mm beneath the flange.

A twenty fourth aspect of the present disclosure includes a pharmaceutical container according to any of the sixteenth to the twenty third aspects, wherein the lower edge of the upper portion is disposed at least 3.0 mm beneath the flange.

A twenty fifth aspect of the present disclosure includes a pharmaceutical container according to any of the sixteenth to the twenty fourth aspects, further comprising a lubricous coating positioned around at least a portion of the outer surface.

A twenty sixth aspect of the present disclosure includes a pharmaceutical container according to any of the sixteenth to the twenty fifth aspects, wherein: the lubricous coating at least partially covers the outer surface at the neck, and at least a portion of the variable thickness region is not covered by the lubricous coating.

A twenty seventh aspect of the present disclosure includes a pharmaceutical container according to any of the sixteenth to the twenty eighth aspects, wherein the neck comprises a uniform thickness region extending between the shoulder and the upper portion.

A twenty eighth aspect of the present disclosure includes a pharmaceutical container according to any of the sixteenth to the twenty ninth aspects, wherein the neck comprises a maximum wall thickness within the uniform thickness region.

A twenty ninth aspect of the present disclosure includes a pharmaceutical container according to any of the sixteenth to the twenty eighth aspects, wherein the neck comprises the maximum wall thickness at least 1 mm beneath the flange.

A thirtieth aspect of the present disclosure includes a pharmaceutical container according to any of the sixteenth to the twenty ninth aspects, wherein the neck comprises the maximum wall thickness at least 2 mm beneath the flange.

A thirty first aspect of the present disclosure includes a pharmaceutical container according to any of the sixteenth to the thirtieth aspects, wherein the glass body forms a vial having a volume that is greater than or equal to 1.0 ml and less than or equal to 30 ml.

A thirty second aspect of the present disclosure includes a method of forming a pharmaceutical container, the method comprising: forming a glass tube comprising an inner surface, an outer surface, and a central axis; heating the glass tube to an elevated temperature; and shaping the heated glass tube to form a neck of a glass container and a flange of the glass container, the shaping comprising: forming the neck by contacting the outer surface of the tube with a forming surface of a converting tool, wherein, during the forming of the neck, a portion of the forming surface extends non-parallel to the central axis of the glass tube such that, after the shaping, the outer surface within at least a sloped portion of the neck is sloped inward towards the central axis with adjacent the flange.

A thirty third aspect of the present disclosure includes a method according to the thirty second aspect, wherein the sloped portion is linearly sloped to form a taper in the neck.

A thirty fourth aspect of the present disclosure includes a method according to any of the thirty second to the thirty third aspects, wherein the forming surface comprises a convex portion for forming an undercut in the neck proximate to the flange.

A thirty fifth aspect of the present disclosure includes a method according to any of the thirty second to the thirty fourth aspects, wherein the forming surface comprises a parallel portion that extends parallel to the central axis when placed in contact with the outer surface to form a uniform thickness region in the neck.

A thirty sixth aspect of the present disclosure includes a method according to any of the thirty second to the thirty fifth aspects, wherein: the flange of the glass container comprises an underside surface, and a boundary between the parallel portion and the portion of the forming surface extending non-parallel to the central axis is disposed at least 1 mm from the underside surface during the forming of the neck.

A thirty seventh aspect of the present disclosure includes a method of capping a pharmaceutical container comprising:

inserting a sealing member into an opening of the pharmaceutical glass container, the pharmaceutical container comprising: a glass body enclosing an interior volume of the pharmaceutical container, the glass body comprising: a central axis extending through a geometric center of the interior volume; a wall thickness extending between an inner surface and an outer surface; a flange comprising an underside surface; a shoulder; and a neck extending between the flange and the shoulder, wherein, within at least a portion of the neck, the outer surface extends inward toward the central axis such that at least a sloped portion of the outer surface is sloped inward towards the central axis with adjacent flange; sliding a cap against the flange such that a portion of the cap extends beyond the underside surface towards the shoulder, and crimping the cap against the underside surface by pressing the portion of the cap extending beyond the underside surface against the underside surface using a capping tool, wherein the capping tool comprises an end surface that contacts the outer surface on the neck at least 1 mm beneath the underside surface of the flange.

A thirty eighth aspect of the present disclosure includes a method according to the thirty seventh aspect, wherein the end surface of the capping tool contacts the outer surface over a contact area that is displaced from the underside surface of the flange.

A thirty ninth aspect of the present disclosure includes a method according to any of the thirty seventh to the thirty eighth aspects, wherein the pharmaceutical container comprises a lubricous coating covering at least a portion of the outer surface.

A fortieth aspect of the present disclosure includes a method according to any of the thirty seventh to the thirty ninth aspects, wherein the end surface only contacts portions of the neck that are covered by the lubricous coating.

A forty first aspect of the present disclosure includes a method according to any of the thirty seventh to the fortieth aspects, wherein the capping tool comprises: an angled surface that extends parallel to the underside surface of the flange during the crimping, and a corner extending between the end surface and the angled surface.

A forty second aspect of the present disclosure includes a method according to any of the thirty seventh to the forty first aspects, wherein the corner does not contact the neck during the crimping.

A forty third aspect of the present disclosure includes a method according to any of the thirty seventh to the forty fourth aspects, wherein, within the sloped portion, the outer surface within the neck extends inward towards the central axis such that the wall thickness decreases within the neck with decreasing distance from the underside surface.

A forty forth aspect of the present disclosure includes a method according to any of the thirty seventh to the forty third aspects, wherein: the glass body comprises a transition region extending between the neck and the underside surface of the flange, and during the crimping, the capping tool does not contact the transition region.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
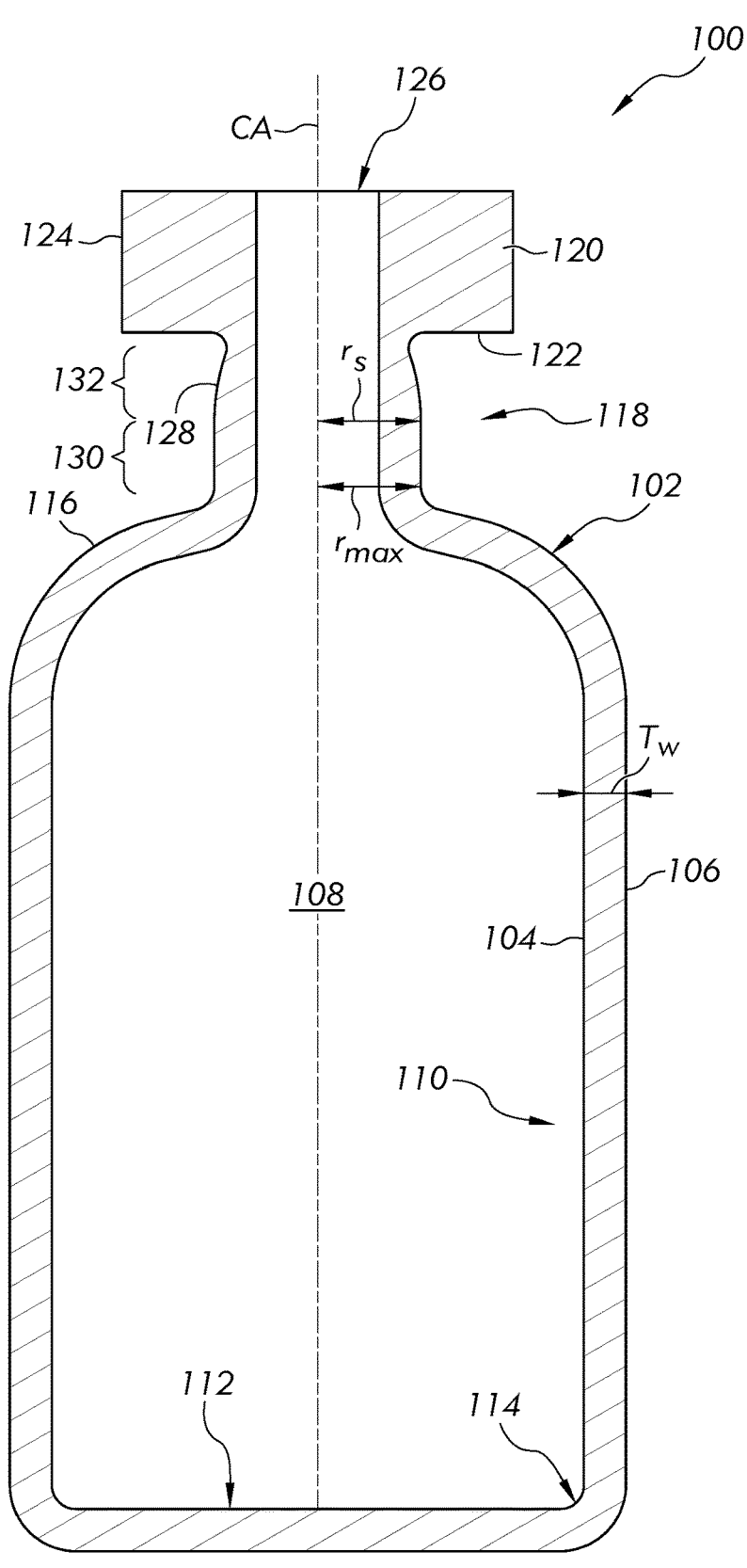
FIG. 1A schematically depicts a pharmaceutical container comprising a neck with a sloped portion, according to one or more embodiments described herein.

Reference will now be made in detail to embodiments of pharmaceutical containers including necks with outer surfaces comprising sloped portions and methods regarding the same. Whenever possible, like reference numerals are used to indicate the incorporation of like components. The pharmaceutical containers of the present disclosure may include a glass body enclosing an interior volume. The glass body may include a central axis extending through a geometric center of the interior volume, a wall thickness extending between an inner surface and an outer surface, a flange comprising an underside surface, a shoulder, and a neck extending between the flange and the shoulder. Within the neck, at least a portion of the outer surface may extend inward toward the central axis such that at least a sloped portion of the outer surface is sloped inward toward the central axis adjacent to the flange. Such a sloped portion in proximity to the flange (e.g., proximate a transition region between the neck and the underside surface of the flange) beneficially provides clearance for contact surfaces of capping tools that are used to crimp metallic caps against the underside surface. The sloped portion may beneficially prevent contact between portions of the capping tools and the pharmaceutical containers (e.g., the transition region between the neck and the underside surface of the flange) that tend to concentrate stress and lead to defects (e.g., cracks, chips, scratches, and the like) forming in the pharmaceutical containers during the capping process. As a result of the sloped portion, the capping tool may contact the neck at a region of the neck where the outer surface conforms in shape to the contact surface of the capping tool, thereby distributing force over a contact area and reducing the probability of defect formation. As a result, the likelihood of failure of the container or contamination of contained materials from capping defects may be reduced.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges am significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Referring now to FIG. 1A, one embodiment of a pharmaceutical container 100 for storing a pharmaceutical formulation is schematically depicted in cross section. The pharmaceutical container 100 comprises a glass body 102. The glass body 102 extends between an inner surface 104 and an outer surface 106 of the glass body 102, includes a central axis CA, and generally encloses an interior volume 108. In the embodiment of the glass body 102 shown in FIG. 1A, the glass body 102 generally comprises a wall portion 110 and a floor portion 112. The wall portion 110 transitions into the floor portion 112 through a heel portion 114. In the depicted embodiment, the glass body 102 includes a flange 120, a neck 118 extending from the flange 120, and a shoulder 116 extending from the neck 118. The central axis CA is orthogonal to the floor portion 112 and extends from the floor portion 112 towards the neck 118. In embodiments, the glass body 102 is symmetrical about a central axis CA. The glass body 102 has a wall thickness $T_W$ which extends between the inner surface 104 to the outer surface 106, as depicted in FIG. 1A.

In embodiments, the glass body 102 may be formed from Type I, Type II or Type III glass as defined in USP <660>, including borosilicate glass compositions such as Type IB borosilicate glass compositions under USP <660>. Alternatively, the glass body 102 may be formed from alkali aluminosilicate glass compositions that meet USP <660> Type I requirements such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass body 102 may include a coating such as a heat tolerant coating disclosed in U.S. Pat. No. 10,0273,049, hereby incorporated by reference in its entirety. In embodiments, the glass body 102 may be constructed from a soda-lime glass composition. In embodiments, the glass body 102 is constructed of a glass composition having a coefficient of thermal expansion that is greater than or equal to $0 \times 10^{-7}/K$ and less than or equal to $100 \times 10^{-7}/K$ (e.g., greater than or equal to $30 \times 10^{-7}/K$ and less than or equal to $70 \times 10^{-7}/K$).

While the glass body 102 is depicted in FIG. 1A as having a specific form-factor (i.e., a vial), it should be understood that the glass body 102 may have other form factors. The geometric features of the outer surface 106 described herein may be used in any glass container wherein capping tools are used to crimp caps thereto to seal the glass container. The geometric features described herein may also be used where glass containers are guided through filling lines where the containers are being guided into certain regions of the line vial guide rails set at the height of the neck. This improved design will minimize contact at the upper portion of the neck. Further, it should be understood that the glass containers described herein may be used for a variety of applications including, without limitation, as pharmaceutical packages, beverage containers, or the like.

The wall thickness $T_W$ of the glass body 102 may vary depending on the implementation. In embodiments, the wall thickness $T_W$ of the glass body 102 may be from less than or equal to 6 millimetres (mm), such as less than or equal to 4 mm, less than or equal to 2 mm, less than or equal to 1.5 mm or less than or equal to 1 mm. In some embodiments, the wall thickness $T_w$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_W$ may be greater than or equal to 0.9 mm and less than or equal to 1.8 mm. The wall thickness $T_W$ may vary depending on the axial location within the glass body 102.

As shown in FIG. 1A, the flange 120 comprises an outer surface 124 defining an outer diameter of the flange 120. In embodiments, the outer diameter may vary between 5 mm and 30 mm (e.g., greater than or equal to 10 mm and less than or equal to 25 mm, 13 mm, 22 mm). The flange 120 also comprises an underside surface 122 that is a portion of the outer surface 106 extending between the outer surface 124 of the flange 120 and the neck 118. An opening 126 extends through the flange 120 and the neck 118 to provide access to the interior volume 108 (e.g., to allow contained materials to be provided into the interior volume 108). It should be understood that the pharmaceutical container 100 (or any of the other pharmaceutical containers described herein) may be formed such that the interior volume 108 has a plurality of different sizes. For in embodiments, the pharmaceutical container 100 may form a vial having a volume that is greater than or equal to 1.0 ml and less than or equal to 50 ml (e.g., 2 ml, 3 ml, 6 ml, 8 ml, 10 ml, 25 ml).

Figure 11:
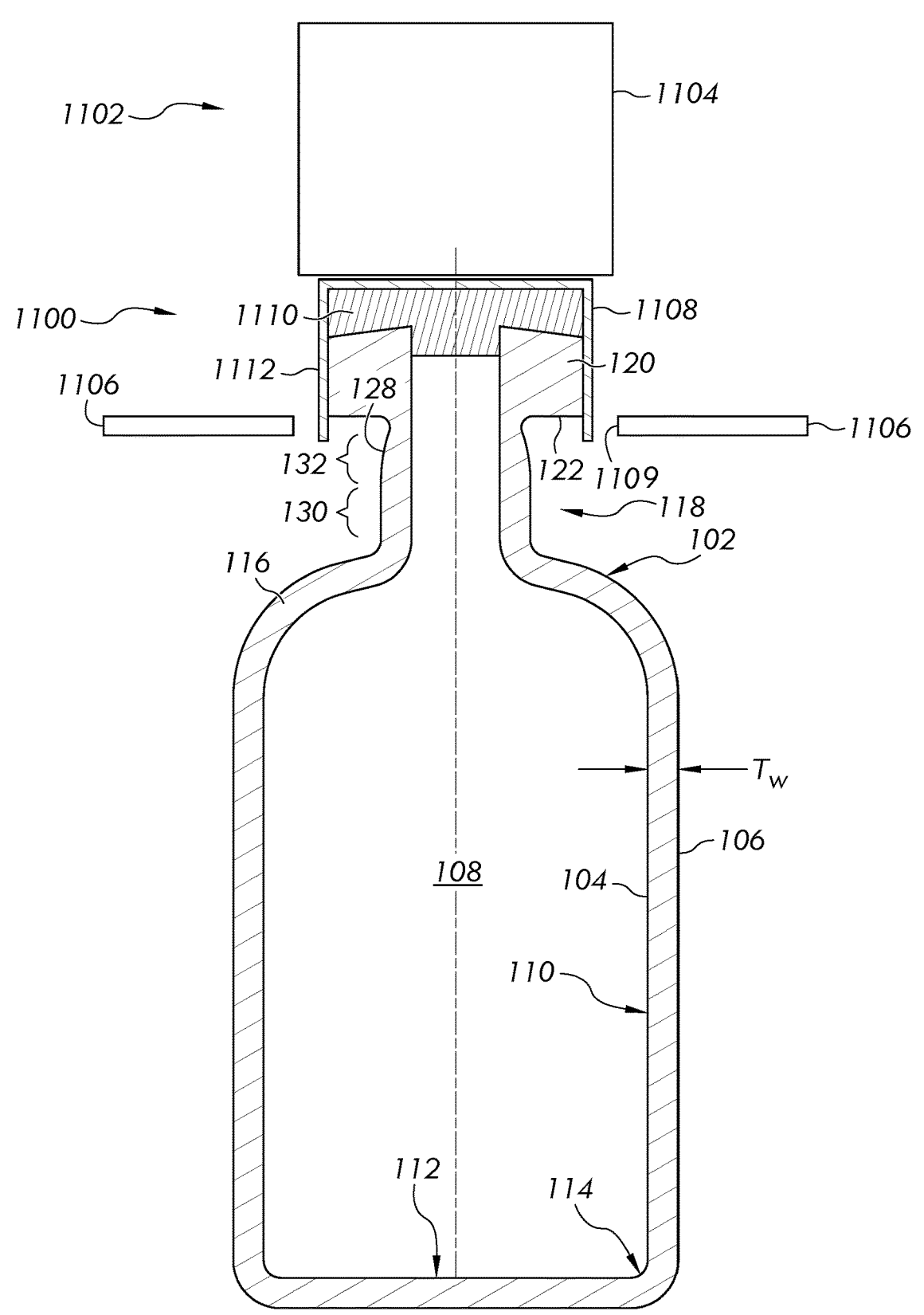
FIG. 11 schematically depicts a pharmaceutical container during a capping process, according to one or more embodiments described herein.
Figure 12:
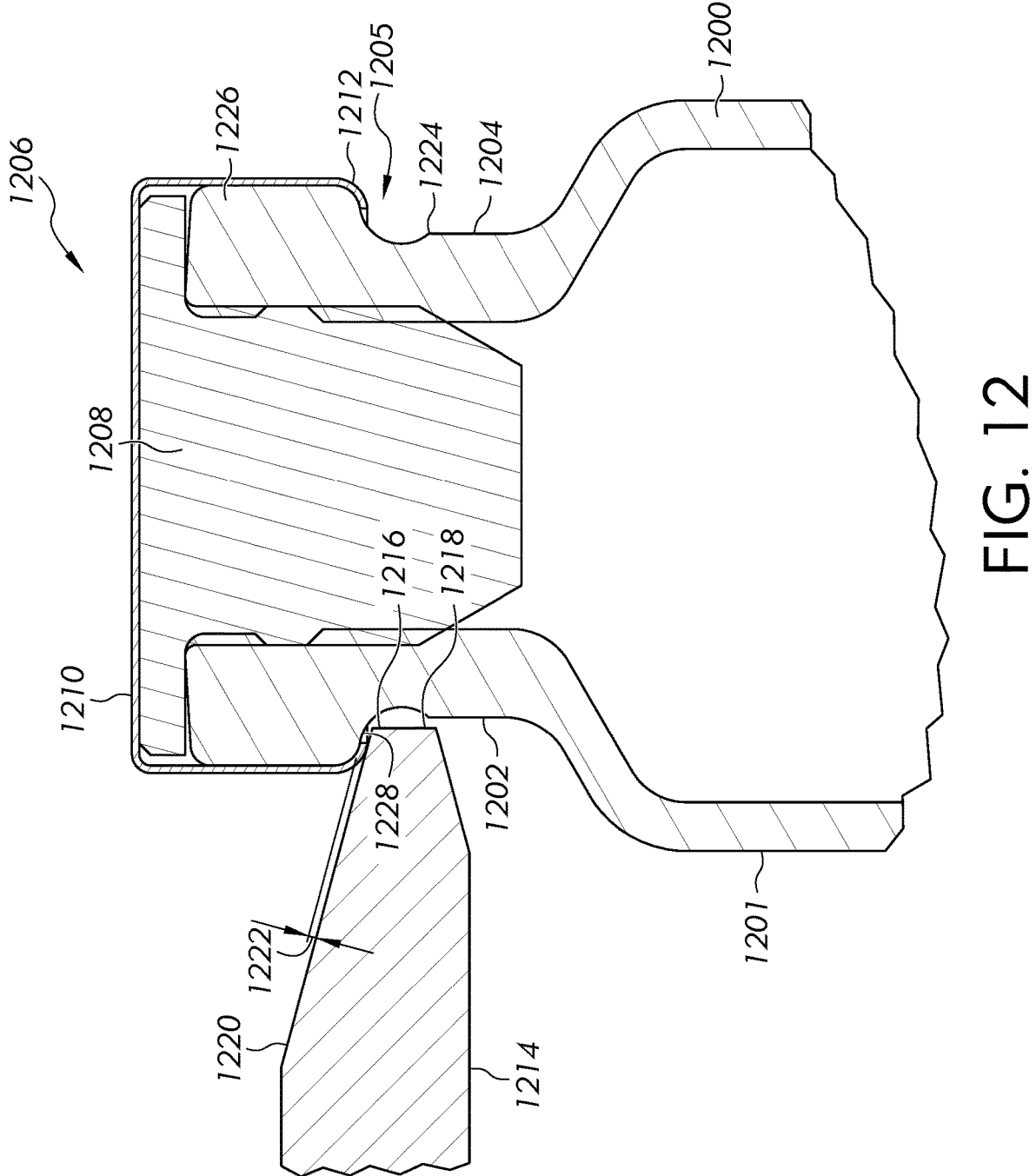
FIG. 12 schematically depicts a pharmaceutical container engaged with a capping tool during a crimping process, according to one or more embodiments described herein.
Figure 13:
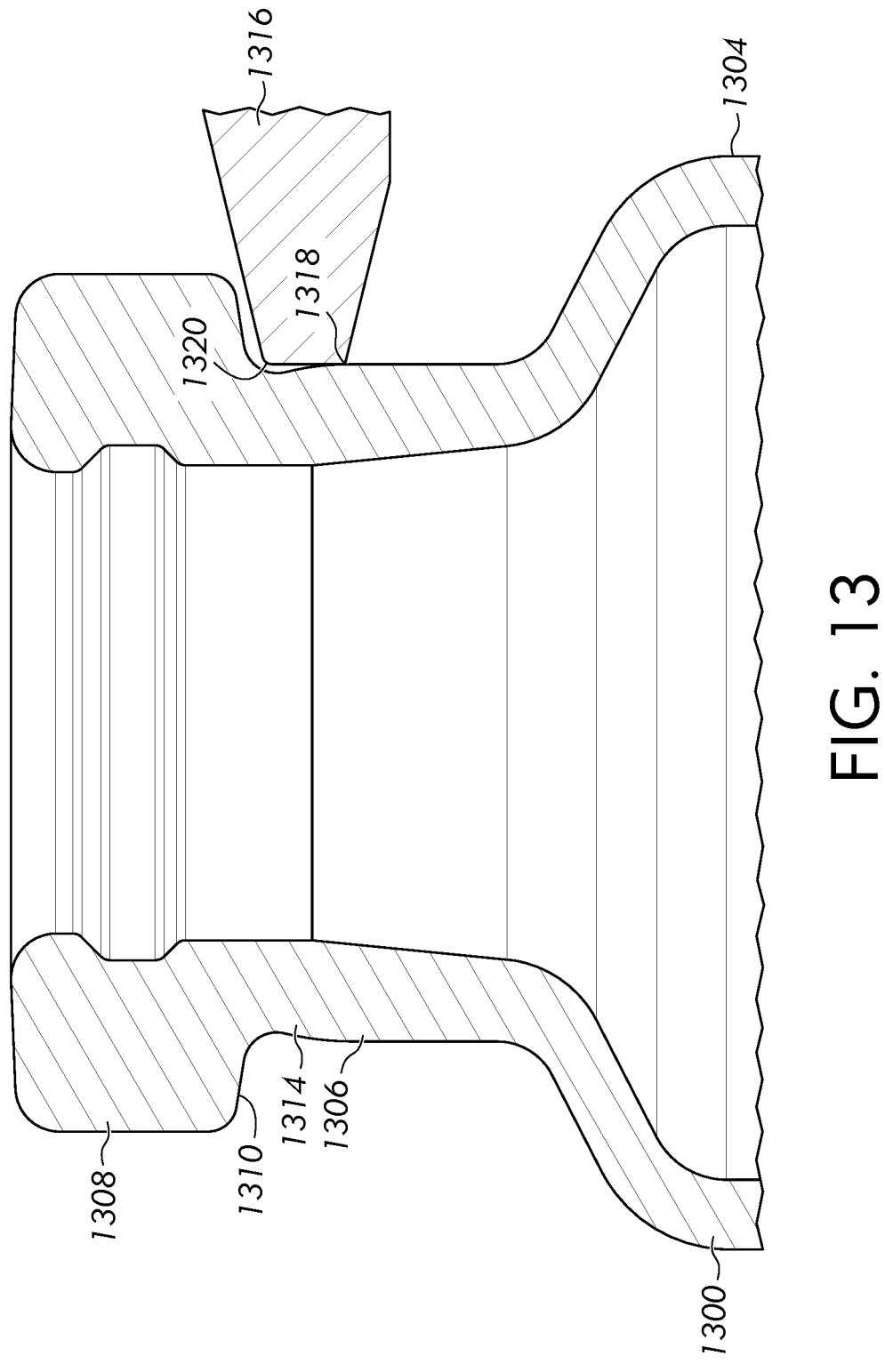
FIG. 13 schematically depicts a pharmaceutical container engaged with a capping tool during a crimping process, according to one or more embodiments described herein.

In embodiments, as described in greater detail herein with respect to FIGS. 11-13, the pharmaceutical container 100 may be sealed via insertion of a closure into the opening 126. In embodiments, for example, the closure comprises a stopper constructed of a suitable elastomeric material (e.g., butyl rubber) that is inserted into the opening 126 and compressed against the flange 120 via a metallic cap. The metallic cap may be crimped to the flange 120 by being bent against the underside surface 122 of the flange 120 via one or more capping tools. For example, the capping tools may move radially inward to compress the metallic cap to the underside surface 122 of the flange 120. Contact between the outer surface 106 and such capping tools may introduce various defects (e.g., chips, cracks, scratches, marks, checks) into the glass body 102. Such defects may cause cracks that propagate within the glass body 102 and potentially lead to contamination to material contained in the interior volume 108.

Figure 1B:
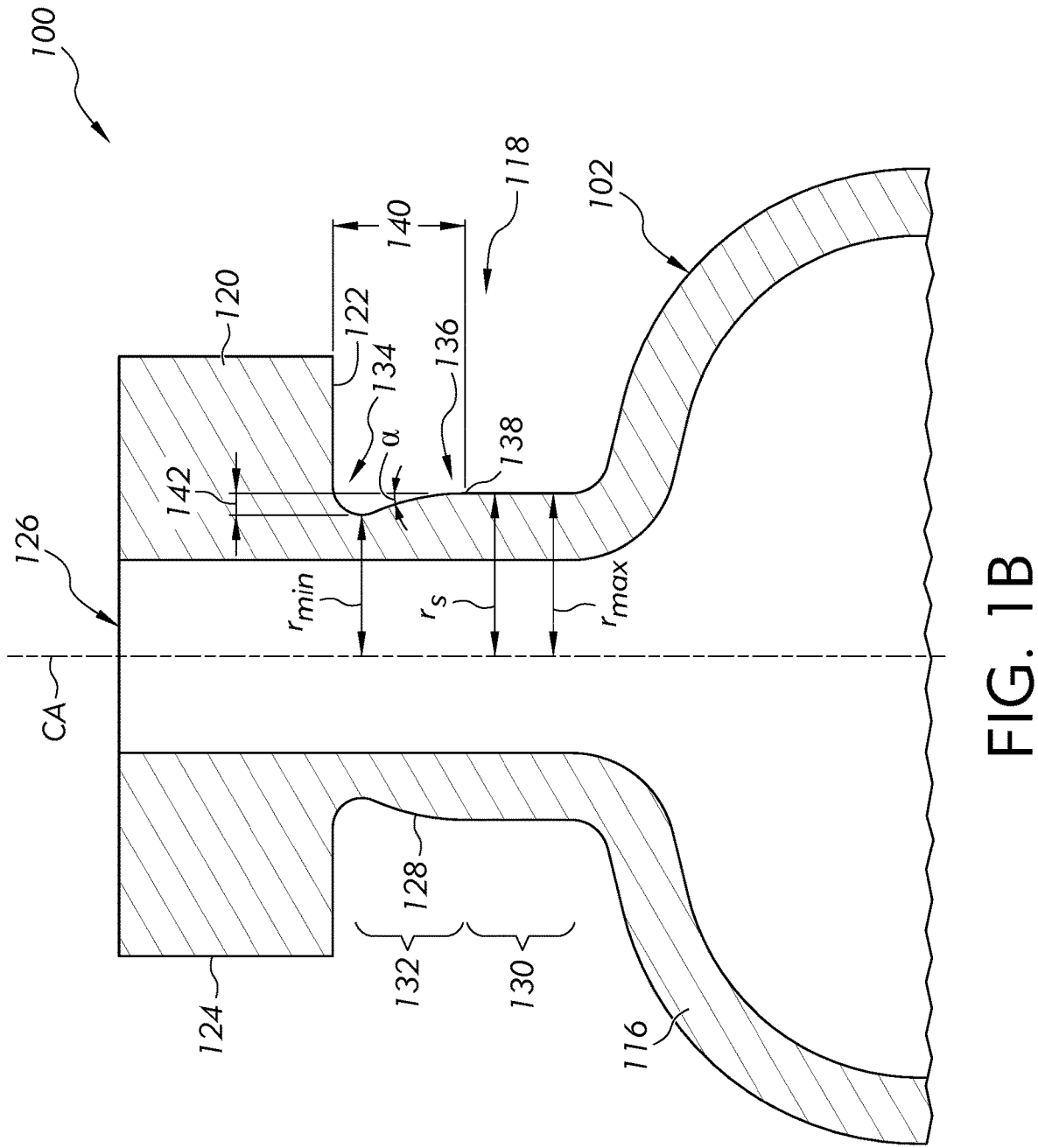
FIG. 1B schematically depicts the neck of the pharmaceutical container depicted in FIG. 1A, according to one or more embodiments described herein.

Referring to FIGS. 1A and 1B, such contact between the outer surface 106 and capping tools may be especially likely to cause defects in the glass body 102 when capping tools contact the outer surface 106 on the neck 118 in proximity to the flange 120. For example, as depicted in FIG. 1B, the outer surface 106 comprises a first transition region 134 extending between the neck 118 and the underside surface 122 of the flange 120. In embodiments, the first transition region 134 of the outer surface 106 follows a curved contour having one or more radii of curvature. An external surface of a capping tool may not conform in shape to the first transition region 134, leading to discrete points of contact between the capping tool and the outer surface 106. Such discrete points of contact may lead to concentration of force applied to the glass body 102 via the capping tool and a substantial likelihood of defect formation.

In view of the foregoing, at least a portion of the outer surface 106 within the neck 118 adjacent the flange 120 extends radially inward towards the central axis CA to form a sloped portion 128. The sloped portion 128 of the outer surface 106 is disposed adjacent the flange 120 and is sloped inward towards the central axis CA. Via the sloped portion 128, material of the glass body 102 is reduced proximate to the flange 120 to aid in reducing the likelihood of contact with capping tools within the first transition region 134. In the depicted embodiment, only a portion of the outer surface 106 within the neck 118 is sloped inward towards the central axis CA. The outer surface 106 comprises a first portion 130 extending from the shoulder 116 and a upper portion 132. In embodiments, within the first portion 130, the outer surface 106 extends parallel to the central axis CA such that a radial distance $r_s$ between the outer surface 106 and the central axis CA as a function of axial position is uniform (e.g., remains constant as a function of axial position) within the first portion 130.

While, in the depicted embodiment, the outer surface 106 includes both a first portion 130 and the upper portion 132, embodiments are envisioned where the pharmaceutical container 100 does not include the first portion 130. In such embodiments, the sloped portion 128 may make up an entirety of the outer surface 106 within neck 118 (e.g., similar to the sloped portion 524 of the pharmaceutical container 500 described herein with respect to FIG. 5). In embodiments, the outer surface 106 may lack the upper portion 132. In such embodiments, an entirety of the outer surface 106 within the neck 118 may extend parallel to the central axis CA, but the outer diameter of the glass body 102 within the neck 118 may be reduced as compared with existing pharmaceutical containers.

In embodiments, within at least part of the upper portion 132, a radial distance $r_s$ between the outer surface 106 and the central axis CA varies as a function of axial position (e.g., as a function of axial distance from a reference point such as the floor portion 112 (see FIG. 1A)). For example, in embodiments, within at least part of the upper portion 132, radial distance $r_s$ between the outer surface 106 and the central axis CA may vary with decreasing axial distance to the first transition region 134. With proximity to the flange 120, the radial distance $r_s$ between the outer surface 106 and the central axis CA may decrease such that, within the upper portion 132, the radial distance $r_s$ reaches a minimum value $r_{min}$. In embodiments, within the upper portion 132, the radial distance $r_s$ between the outer surface 106 and the central axis CA continuously decreases with decreasing axial distance from the first transition region 134 of the outer surface 106 extending between the neck 118 and the flange 120. In the first transition region 134, the outer surface 106 may extend radially outward (e.g., sloping away from the central axis CA) from the neck 118.

In embodiments, as a result of the sloped portion 128, at least a portion of the first transition region 134 is disposed radially inward of an outer portion 138 of the outer surface 106 within the neck 118. The outer portion 138 may represent a portion of the outer surface 106 that is most radially distant from the central axis CA within the neck 118 (e.g., where the radial distance $r_s$ between the outer surface 106 and the central axis CA comprises a maximum value max). In embodiments, the radial distance $r_s$ has the maximum value $r_{max}$ throughout an entirety of the first portion 130. As described herein, capping tools used to seal the pharmaceutical container 100 may contact the outer portion 138. In embodiments, an upper edge of the outer portion 138 (e.g., an uppermost location on the outer surface 106 that is disposed a maximum radial distance $r_{max}$ from the central axis CA within the neck 118) is disposed an axial distance 140 from the underside surface 122 of the flange 120. In embodiments, the axial distance 140 is greater than 1.0 mm (e.g, greater than or equal to 2.0 mm, greater than or equal to 3.0 mm). As a result, a boundary of the outer portion 138 may be disposed greater than or equal to 1.0 mm (e.g, greater than or equal to 2.0 mm, greater than or equal to 3.0 mm) beneath the flange 120 (e.g., beneath the underside surface 122 of the flange 120). The axial distance 140 separating the outer portion 138 from the underside surface 122 may prevent capping tools from contacting the neck 118 at the upper portion 132 or at the first transition region 134, thereby preventing concentration of stress and aiding in reducing the probability of defect formation during capping.

The upper portion 132 of the outer surface 106 within the neck 118 may have a variety of forms. In the depicted embodiment, for example, the upper portion 132 comprises a sloped portion 128 that is linearly sloped towards the central axis CA (e.g., as a function of decreasing axial distance from the underside surface 122). The sloped portion 128 may form a conical region of the outer surface 106. At least a portion of the sloped portion 128 may extend at an angle α relative to the central axis CA. Throughout the upper portion 132, the angle α may be greater than 0° (e.g., greater than or equal to 0.1°, greater than or equal to 0.2°, greater than or equal to 0.5°, greater than or equal to 1.0°, greater than or equal to 1.5°, greater than or equal to 2.0°, greater than or equal to 2.5°, greater than or equal to 3.0°, greater than or equal to 3.5°, greater than or equal to 4.0°, greater than or equal to 4.5°, greater than or equal to 5.0°, and any values in between). In embodiments, the sloped portion 128 may include a constant linear slope. In embodiments, the sloped portion 128 may include a variable slope where the slope towards the central axis CA varies as a function of axial position such that the sloped portion 128 follows a suitable non-linear surface profile (e.g., such that the angle α varies as a function of axial position).

The angle α at which the outer surface 106 extends relative to the central axis CA may be measured using a suitable image processing technique. For example, in embodiments, the glass body 102 may be cut along a plane extending parallel to and including the central axis CA, and an image may be captured of the a cross-section of the glass body 102. Image processing techniques may be used to determine the geometric shape of the outer surface 106. The angle α may be measured by fitting a line to a segment of the outer surface 106 with a predetermined analysis length A (e.g., 0.1 mm, 0.2 mm, 0.5 mm). The line may extend through a plurality of points (e.g. 2 points, 3, points, 4 points, 5 points, or any suitable number of points) within the segment of the outer surface 106 contained within the cross-section. An angle between the line and the central axis CA may then be measured to determine the angle α for that particular segment. As will be appreciated, the boundaries of the segment under analysis may determine the value for the angle α obtained. For example, a first segment having a lower end (e.g., more proximate to the shoulder 116) lying at a lower boundary of the sloped portion 128 (e.g., at the second transition region 136) may result in a different value for the angle α than a second segment having a lower end disposed more proximate to the flange 120. In embodiments, the glass body 102 is not cut and the angle α is measured from a side-view image of an entirety of the glass body 102. In accordance with the present disclosure, similar techniques may be used to measure radii of curvature of the outer surface 106 (e.g., by fitting a circular arc to a portion of the image).

In embodiments, the angle α (or any other feature described herein) could be measured using a backlight and using image analysis techniques. In an example, an image analysis technique may be used to draw a line from the shoulder 116 to the underside surface 122 of the flange 120 and measure the deviation from that line axially upward from the shoulder 116 to the underside surface 122 of the flange 120 with a given number of points. Enough points may be collected to accurately represent the shape of the neck 118. In embodiments, a micro-touch probe may be used to trace the shape of the neck 118 and provide differences in lateral distance axially along the neck 118 from the shoulder 116 to the underside surface 122 of the flange 120 from a datum (central axis of the container).

In embodiments, as a result of the sloped portion 128, within the upper portion 132, the outer surface 106 extends radially inward from the outer portion 138 towards the central axis by at least a radial distance 142 that is greater than or equal to 0.1 mm (e.g, greater than or equal to 0.15 mm, greater than or equal to 0.20 mm, greater than or equal to 0.225 mm, greater than or equal to 0.250 mm). Such a radial distance 142 beneficially provides space to prevent contact between capping tools and the neck 118 adjacent the flange 120 (e.g., within the first transition region 134). In addition to avoiding stress concentration via contact with the first transition region 134, eliminating points of contact between capping tools and the neck 118 proximate to the flange (e.g., within the upper portion 132) also aids in detecting flaws that may be introduced into the glass body 102 during capping. The underside surface 122 or the first transition region 134, for example, may cause scattering of optical signals used to detect defects in the pharmaceutical container 100 introduced during capping. Contact between the neck 118 and capping tools in areas that are displaced from the underside surface 122 (e.g., by at least the axial distance 140) may increase the detectability of capping flaws and ensure the safety of patients or other users by facilitating the discarding of defective containers.

In embodiments, within the neck 118, the outer surface 106 comprises a second transition region 136. The second transition region 136 may demarcate a boundary between the first portion 130 and the upper portion 132 where the outer surface 106 slopes inward toward the central axis CA. The second transition region 136 may include an edge of the sloped portion 128 where the outer surface 106 transitions from extending parallel or outward from the central axis CA to extending inward toward the central axis CA. In embodiments, within the second transition region 136, the outer surface 106 is curved with a radius of curvature having a magnitude that is greater than that within the first transition region 134. A lesser magnitude radius of curvature within the first transition region 134 reduces glass material adjacent the flange 120, rendering contact between the neck 118 and capping tools adjacent the flange 120 less likely. Moreover, a greater magnitude radius of curvature within the second transition region 136 may avoid points of contact between the neck 118 and capping tools. Such a second transition region 136 may facilitate a portion of the capping tool that contacts the outer surface 106 conforming in shape to the outer surface 106, beneficially distributing force applied by the capping tool over a contact area, thereby aiding in reducing the likelihood of defect formation.

In the depicted embodiment, the inner surface 104 within the neck 118 extends parallel to the central axis CA. As a result, within the upper portion 132, the wall thickness $T_W$ decreases with proximity to the flange 120 or with increasing axial distance from the shoulder 116. In embodiments, the wall thickness $W_T$ may decrease by at least the radial distance 142 that the sloped portion 128 extends inward towards the central axis CA. Within the upper portion 132, the wall thickness $T_W$ may reach a minimum value within the neck 118. In embodiments, the axial position at which the minimum value is reached demarcates a lower boundary of the first transition region 134. Such a positioning of the minimum wall thickness may aid in reducing the probability of capping tools contacting the first transition region 134. Flaws introduced within the upper portion 132 in such embodiments may also beneficially result in flaws that are more noticeable via visible inspection. For example, surface flaws introduced into the upper portion 132 during capping may be more likely to result in visibly noticeable flaws, aiding in the discarding of defective containers after capping. A minimum wall thickness within the upper portion 132 may also cause the neck 118 to break during capping, resulting in the discarding of containers that may otherwise have moved forward in the production process after capping despite having capping flaws.

Embodiments are envisioned where the inner surface 104 within at least a portion of the neck 118 does not extend parallel to the central axis CA. For example, at least a portion of the inner surface 104 within the neck 118 may extend inward toward the central axis CA such that the wall thickness $T_W$ increases or remains constant within the upper portion 132. The present disclosure is not limited to any particular configuration of the inner surface 104 within the neck 118. As a result, the wall thickness $T_W$ may or may not decrease within the upper portion 132.

Figure 2:
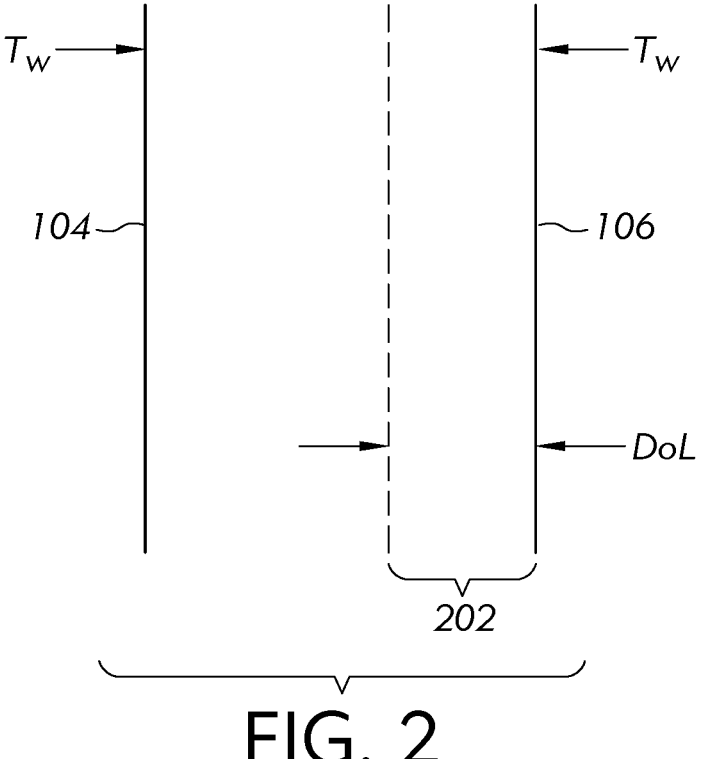
FIG. 2 schematically depicts a cross-sectional view of a glass container, according to one or more embodiments described herein.

Referring to FIG. 2, in embodiments, the glass body 102 includes a compressively stressed layer 202 extending from at least the outer surface 106 of the glass body 102 into the wall thickness $T_W$ to a depth of compression DOC from the outer surface 106 of the glass body 102. The compressively stressed layer 202 generally increases the strength of the pharmaceutical container 100 and also improves the damage tolerance of the pharmaceutical container 100. Specifically, a glass container having a compressively stressed layer 202 is generally able to withstand a greater degree of surface damage, such as scratches, chips, or the like, without failure compared to a non-strengthened glass container as the compressively stressed layer 202 mitigates the propagation of cracks from surface damage in the compressively stressed layer 202.

Several different techniques may be utilized to form the compressively stressed layer 202 in the glass body 102 of the pharmaceutical container 100. For example, in embodiments where the glass body 102 is formed from ion exchangeable glass, the compressively stressed layer 202 may be formed in the glass body 102 by ion exchange. In these embodiments, the compressively stressed layer 202 is formed by placing the glass container in a bath of molten salt to facilitate the exchange of relatively large ions in the molten salt for relatively smaller ions in the glass. Several different exchange reactions may be utilized to achieve the compressively stressed layer 202. In one embodiment, the bath may contain molten $KNO_3$ salt while the glass from which the pharmaceutical container 100 is formed contains lithium and/or sodium ions. In this embodiment, the potassium ions in the bath are exchanged for the relatively smaller lithium and/or sodium ions in the glass, thereby forming the compressively stressed layer 202. In another embodiment, the bath may contain $NaNO_3$ salt and the glass from which the pharmaceutical container 100 is formed contains lithium ions. In this embodiment, the sodium ions in the bath are exchanged for the relatively smaller lithium ions in the glass, thereby forming the compressively stressed layer 202.

In one specific embodiment, the compressively stressed layer 202 may be formed by submerging the glass container in a molten salt bath of 100% $KNO_3$ or, in the alternative, a mixture of $KNO_3$ and $NaNO_3$. For example, in one embodiment the molten salt bath may include $KNO_3$ with up to about 10% $NaNO_3$. In this embodiment, the glass from which the container is formed may include sodium ions and/or lithium ions. The temperature of the molten salt bath may be greater than or equal to 350° C. and less than or equal to 500° C. In some embodiments, the temperature of the molten salt bath may be greater than or equal to 400° C. and less than or equal to 500° C. In still other embodiments, the temperature of the molten salt bath may be greater than or equal to 450° C. and less than or equal to 475° C. The glass body 102 may be held in the molten salt bath for a time period sufficient to facilitate the exchange of the relatively large ions in the salt bath with relatively smaller ions in the glass and thereby achieve the desired surface compressive stress and depth of layer. For example, the glass may be held in the molten salt bath for a period of time which is greater than or equal to 0.05 hours to less than or equal to about 20 hours in order to achieve the desired depth of layer and surface compressive stress. In some embodiments the glass container may be held in the molten salt bath for greater than or equal to 4 hours and less than or equal to about 12 hours. In other embodiments, the glass container may be held in the molten salt bath for greater than or equal to about 5 hours and less than or equal to about 8 hours. In one embodiment, the glass container may be ion exchanged in a molten salt bath which comprises 100% $KNO_3$ at a temperature greater than or equal to about 400° C. and less than or equal to about 500° C. for a time period greater than or equal to about 5 hours and less than or equal to about 8 hours.

Typically, the ion exchange process is performed at temperatures greater than 150° C. below the strain point ($T_{strain}$) of the glass in order to minimize stress relaxation due to elevated temperatures. However, in some embodiments, the compressively stressed layer 202 is formed in a molten salt bath which is at temperature greater than the strain point of the glass. This type of ion exchange strengthening is referred to herein as "high temperature ion-exchange strengthening." In high temperature ion-exchange strengthening, relatively smaller ions in the glass are exchanged with relatively larger ions from the molten salt bath, as described herein. As the relatively smaller ions are exchanged for relatively larger ions at temperatures above the strain point, the resultant stress is released or "relaxed". However, the replacement of smaller ions in the glass with larger ions creates a surface layer in the glass which has a lower coefficient of thermal expansion (CTE) than the remainder of the glass. As the glass cools, the CTE differential between the surface of the glass and the remainder of the glass creates the compressively stressed layer 202. This high temperature ion-exchange technique is particularly well suited to strengthening glass articles, such as glass containers, which have complex geometries and typically reduces the time of the strengthening process relative to typical ion exchange processes and also enables a greater depth of layer.

Figure 3:
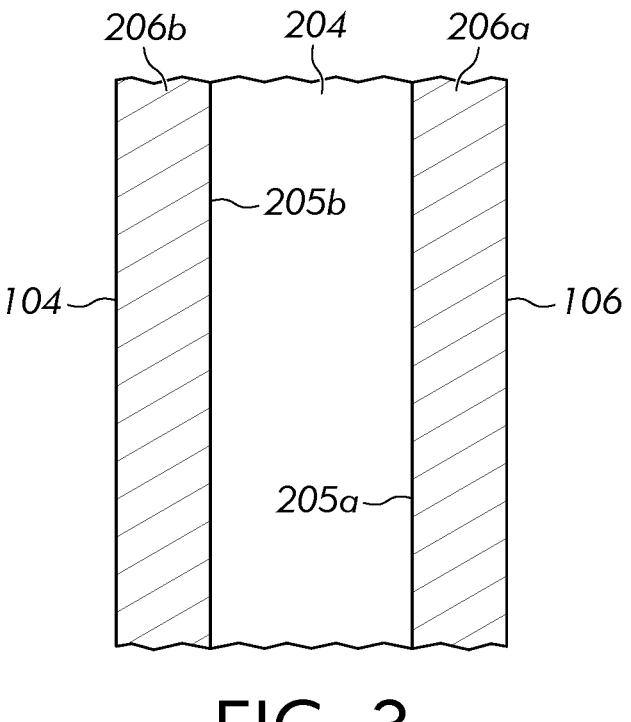
FIG. 3 schematically depicts across-sectional view of a glass container, according to one or more embodiments described herein.

Referring to FIG. 3, in embodiments, the pharmaceutical container 100 may be formed from laminated glass which facilitates the formation of a compressively stressed layer 202 in at least the outer surface 106 of the glass body 102. The laminated glass generally comprises a glass core layer 204 and at least one glass cladding layer 206a. In the embodiment of the pharmaceutical container 100 depicted in FIG. 3, the laminated glass includes a pair of glass cladding layers 206a, 206b. In this embodiment, the glass core layer 204 generally comprises a first surface 205a and a second surface 205b which is opposed to the first surface 205a. A first glass cladding layer 206a is fused to the first surface 205a of the glass core layer 204 and a second glass cladding layer 206b is fused to the second surface 205b of the glass core layer 204. The glass cladding layers 206a. 206b are fused to the glass core layer 204 without any additional materials, such as adhesives, coating layers or the like, disposed between the glass core layer 204 and the glass cladding layers 206a, 206b.

In the embodiment shown in FIG. 3, the glass core layer 204 is formed from a first glass composition having an average core coefficient of thermal expansion $CTE_{core}$ and the glass cladding layers 206a, 206b are formed from a second, different glass composition which has an average coefficient of thermal expansion $CTE_{clad}$. In the embodiments described herein, $CTE_{core}$ is not equal to $CTE_{clad}$ such that a compressive stress layer is present in at least one of the core layer or the cladding layer. In some embodiments, $CTE_{core}$ is greater than $CTE_{clad}$ which results in the glass cladding layers 206a, 206b being compressively stressed without being ion exchanged or thermally tempered. In such embodiments, one of the glass cladding layers 206a, 206b may comprise the compressively stressed layer 202 depicted in FIG. 2. In some other embodiments, such as when the laminate glass comprises a single layer and a single cladding layer, $CTE_{clad}$ may be greater than $CTE_{core}$ which results in the glass core layer being compressively stressed without being ion exchanged or thermally tempered. The laminated glass may be formed by a fusion lamination process such as the process described in U.S. Pat. No. 10,450,214, which is incorporated herein by reference. When the laminated glass is used to form a container, these compressively stressed layers extend from the outer surface 106 of the pharmaceutical container 100 into the wall thickness $T_W$ and from the inner surface 104 of the glass container into the wall thickness $T_W$.

Referring to FIG. 2, the DOC to which the compressively stressed layer 202 extends into the wall thickness $T_W$ may depend on the methodology used to form compressively stressed layer 202. Depending on the implementation, the compressively stressed layer 202 may extend from the outer surface 106 of the body of the glass container into the wall thickness $T_W$ to a DOC which is greater than or equal to about 1 μm and less than or equal to about 90% of the wall thickness $T_W$. In embodiments where the compressively stressed layer 202 is formed as a sub-layer of laminated glass, the compressively stressed layer 202 may extend from the outer surface 106 of the glass body 102 of the glass container into the wall thickness $T_W$ to a DOC which is greater than or equal to about 1 μm and less than or equal to about 33% of the wall thickness $T_W$. In embodiments where the compressively stressed layer 202 is formed by subjecting the pharmaceutical container 100 to an ion exchange process, the compressively stressed layer 202 may extend from the outer surface 106 of the glass body 102 of the pharmaceutical container 100 into the wall thickness $T_W$ to a DOC which is greater than or equal to about 1 μm and less than or equal to about 10% of the wall thickness $T_W$.

In embodiments, the compressively stressed layer 202 (e.g., both the glass cladding layers 206a, 206b) may be under a compressive stress of greater than or equal to 50 megapascals (MPa), greater than or equal to 75 MPa, greater than or equal to 100 MPa, or even greater than or equal to 150 MPa. For example, in embodiments, the compressively stressed layer 202 may be under a compressive stress of greater than or equal to 50 MPa and less than or equal to 700 MPa, greater than or equal to 50 MPa and less than or equal to 500 MPa, greater than or equal to 50 MPA and less than or equal to 400 MPa, greater than or equal to 75 MPa and less than or equal to 750 MPa, greater than or equal to 75 MPa and less than or equal to 500 MPa, greater than or equal to 75 MPa and less than or equal to 400 MPa, greater than or equal to 100 MPa and less than or equal to 700 MPa, greater than or equal to 100 MPa and less than or equal to 500 MPa, or even greater than or equal to 100 MPa and less than or equal to 400 MPa.

In embodiments, the remainder of the pharmaceutical container 100 outside of the compressively stressed layer 202 (e.g., the glass core layer 204 described with respect to FIG. 3) are under a central tension that balances the compressive stress of the compressively stressed layer 202. For example, in embodiments, as a result of the CTE mismatch between the outer clad layers 206a, 206b, the glass core layer 204 may exhibit a central tension, or tensile stress greater than or equal to 10 MPa and less than or equal to 50 MPa, such as greater than or equal to 10 MPa and less than or equal to 40 MPa, greater than or equal to 10 MPa and less than or equal to 30 MPa, greater than or equal to 15 MPa and less than or equal to 50 MPa, greater than or equal to 15 MPa and less than or equal to 40 MPa, or greater than or equal to 15 MPa and less than or equal to 30 MPa. In embodiments (e.g., where the compressively stressed layer 202 is formed by subjecting the pharmaceutical container 100 to ion exchange), the glass core layer 204 may exhibit a central tension of between 10-15 MPa.

Figure 4:
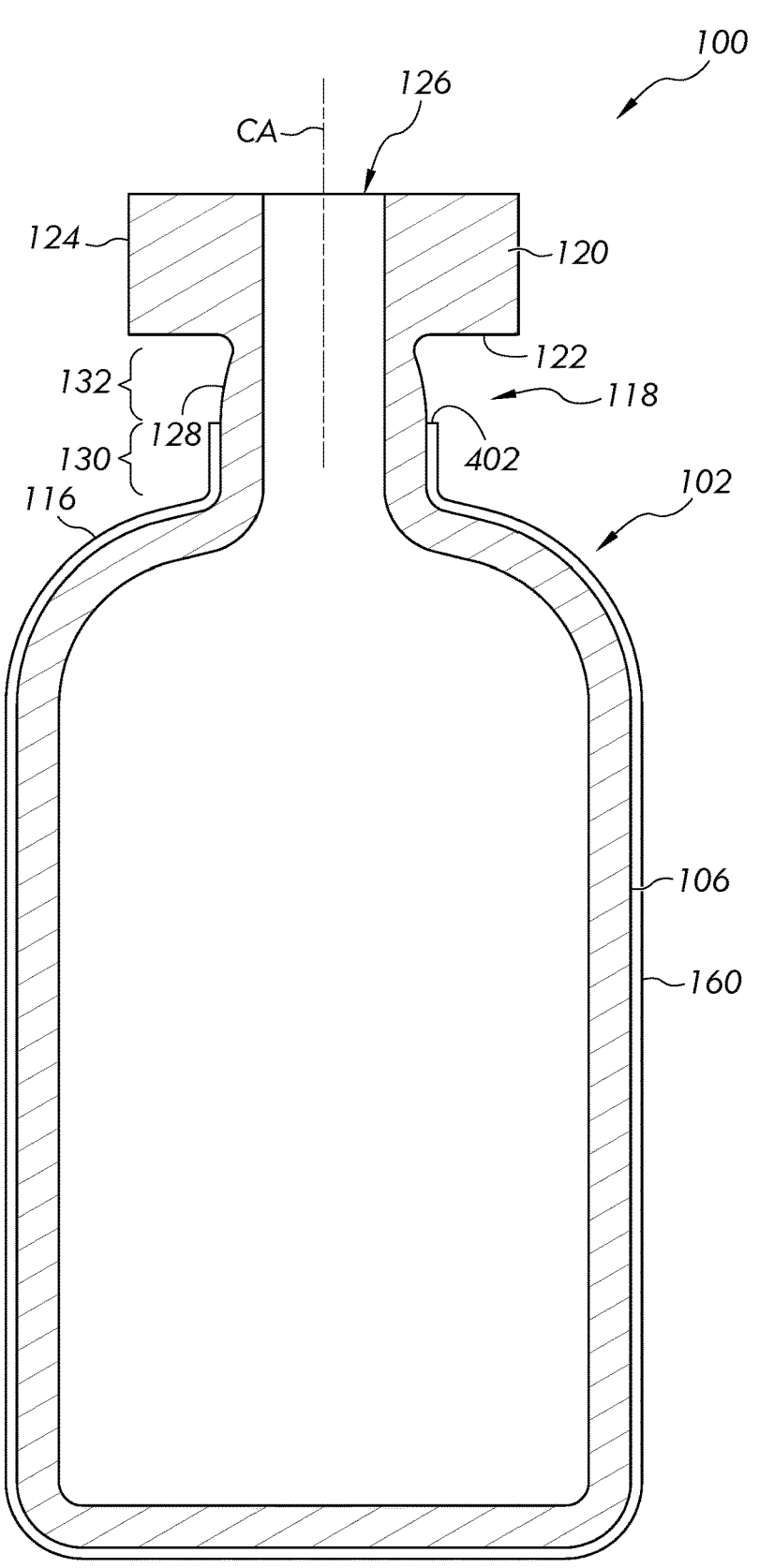
FIG. 4 schematically depicts a pharmaceutical container comprising a lubricous coating at least partially covering an outer surface thereof, according to one or more embodiments described herein.

FIG. 4 depicts an embodiment of the pharmaceutical container 100 described herein with respect to FIGS. 1A-3 that further comprises a lubricous coating 160 disposed around at least a portion of the outer surface 106. The term "lubricous," as used herein, means that the coating applied to the outer surface of the glass container has a lower coefficient of friction than the uncoated glass container thereby providing the glass container with an improved resistance to damage such as scuffs, abrasions or the like. In embodiments, the lubricous coating 160 may be a coating as described in U.S. patent application Ser. No. 15/331,113, issued as U.S. Pat. No. 9,744,099, entitled "Glass articles with low-friction coatings," hereby incorporated by reference in its entirety.

In some embodiments, the lubricous coating 160 may be positioned on at least the outer surface 106 of the glass body 102 while, in other embodiments, one or more intermediate coatings may be positioned between the lubricous coating 160 and the outer surface 106 of the glass body 102. The lubricous coating 160 decreases the coefficient of friction of the portion of the glass body 102 with the coating and, as such, decreases the occurrence of abrasions and surface damage on the outer surface 106 of the glass body 102 (such as those caused by contact with capping tools). In essence, the coating allows the container to "slip" relative to another object (or container) thereby reducing the possibility of surface damage on the glass. Moreover, the lubricous coating 160 also cushions the glass body 102 of the pharmaceutical container 100, thereby lessening the effect of blunt impact damage to the glass container.

The lubricous coating 160 may be formed from any suitable material. For example, in embodiments, the lubricous coating 160 is an inorganic coating. The inorganic coating may be permanently adhered to the outer surface 106 of the glass body 102 or temporarily adhered to the outer surface 106 of the glass body 102. In embodiments where the lubricous coating comprises an inorganic coating, for example, the inorganic coating may comprise a metal nitride coating, a metal sulfide coating, a metal oxide coating, $SiO_2$, diamond-like carbon, or a carbide coating. In embodiments, the lubricous coating 160 may include at least one of TIN, BN, hBN, $TiO_2$, $Ta_2O_5$, $HfO_2$, $Nb_2O_5$, $V_2O_5$, SnO, $SnO_2$, $ZrO_2$, $Al_2O_3$, $SiO_2$, ZnO, $MoS_2$, BC, SiC, or similar metal oxide, metal nitride and carbide coatings which exhibit a relatively low coefficient of friction relative to a like-coated glass container as well as having relatively high thermal stabilities. In embodiments, the lubricous coating 160 is an organic coating. Such an organic coating may be temporarily or permanently affixed to the outer surface 106. Various suitable organic materials may be used to form the lubricous coating.

As depicted in FIG. 4, the lubricous coating 160 may not cover an entirety of the glass body 102. At least a portion of the outer surface 106 may not be covered by the lubricous coating 160. In the depicted embodiment, for example, an end 402 of the lubricous coating 160 is disposed on the neck 118. For example, the flange 120 may be left uncovered by the lubricous coating to facilitate capping (e.g., via friction between a cap assembly and the outer surface 106) and, as a result, the end 402 may be disposed on the neck 118. As a result, a portion of the outer surface 106 on the neck 118 may be covered by the lubricous coating 160, while, upward of the end 402, the neck 118 may not be covered by the lubricous coating 160.

In embodiments, the outer surface 106 extends inward towards the central axis CA within a region of the neck 118 that does not comprise (e.g., is not covered by) the lubricous coating 160. For example, in embodiments, at least a portion of the sloped portion 128 is not covered by the lubricous coating 160. In embodiments, the end 402 is disposed on the first portion 130 of the outer surface 106 on the neck 118. In embodiments, the upper portion 132 of the outer surface 106 is not covered by the lubricous coating 160. In embodiments, the outer portion 138 (see FIGS. 1A-1B) is covered by the lubricous coating 160 and disposed beneath the end 402. In embodiments, the end 402 may be disposed at most the axial distance 140 (see FIG. 1B) from the underside surface 122 of the flange 120. Such positioning of the end 402 beneficially ensures that capping tools that contact the outer surface 106 at the outer portion 138 (see FIG. 1B) contact the lubricous coating 160, thereby aiding in reducing the probability of defect formation during capping. In embodiments, the end 402 is disposed on the second transition region 136 (e.g., at a point of transition between the first portion 130 and the upper portion 132) such that the first portion 130 is completely covered by the lubricous coating. Such a configuration may reduce the probability that capping tools contact any portion of the outer surface 106 that is not covered by the lubricous coating 160.

Figure 5:
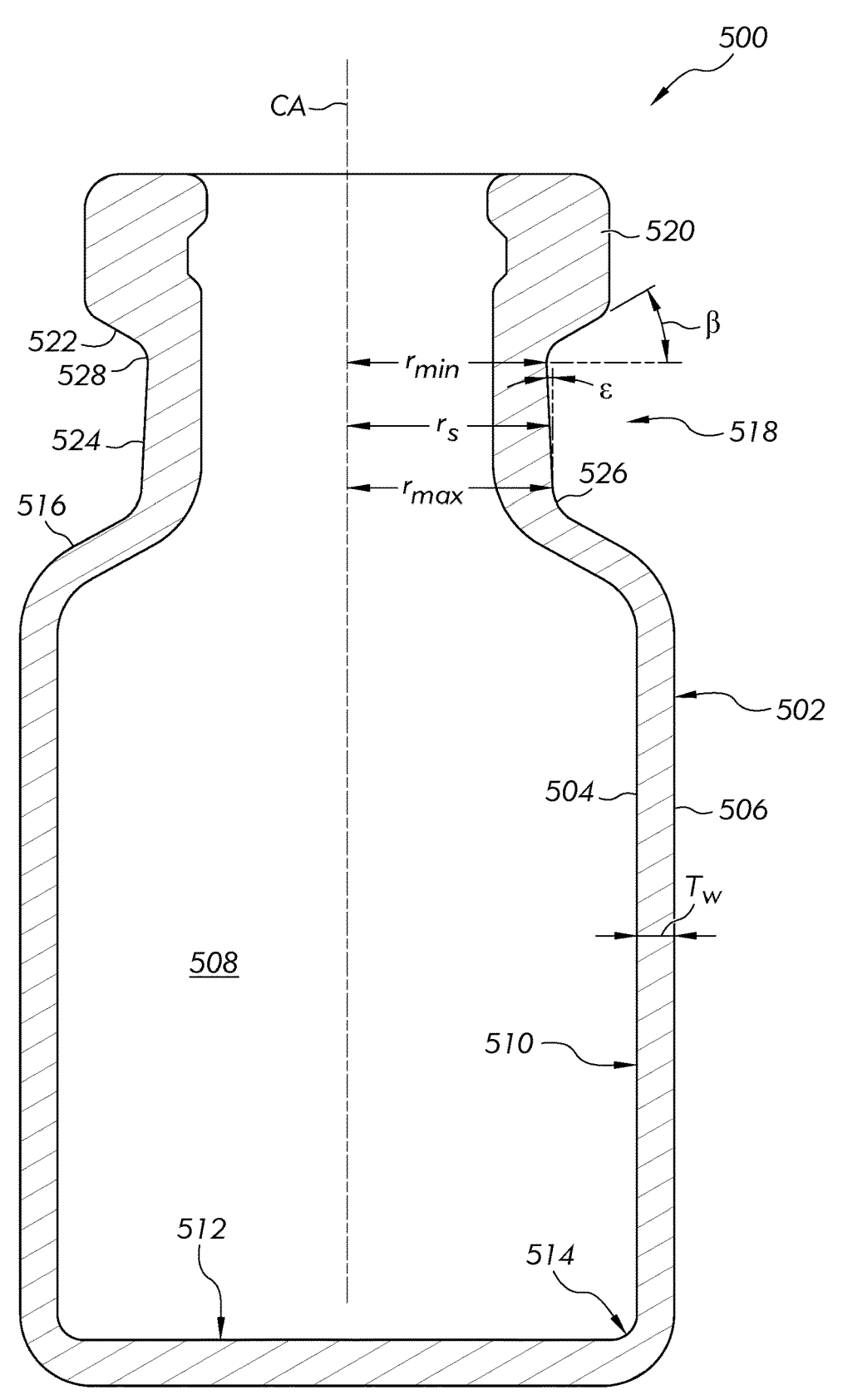
FIG. 5 schematically depicts a pharmaceutical container comprising a neck with a sloped portion, according to one or more embodiments described herein.

FIG. 5 schematically depicts a pharmaceutical container 500 for storing a pharmaceutical formulation is schematically depicted in cross section. The pharmaceutical container 500 comprises a glass body 502. The glass body 502 extends between an inner surface 504 and an outer surface 506 of the glass body 502, includes a central axis CA, and generally encloses an interior volume 508. In the embodiment of the glass body 502 shown in FIG. 5, the glass body 502 generally comprises a wall portion 510 and a floor portion 512. The wall portion 510 transitions into the floor portion 512 through a heel portion 514. In the depicted embodiment, the glass body 502 includes a flange 520, a neck 518 extending from the flange 520, and a shoulder 516. The neck 518 extends between the shoulder 516 and the flange 520. The central axis CA is orthogonal to the floor portion 512 and extends from the floor portion 512 towards the neck 518. In embodiments, the glass body 502 is symmetrical about a central axis CA. The glass body 502 has a wall thickness $T_W$ which extends between the inner surface 504 to the outer surface 506, as depicted in FIG. 5.

The pharmaceutical container 500 may be substantially similar in structure to the pharmaceutical container 100 described herein with respect to FIGS. 1A-3, with the exception that the neck 518 of the pharmaceutical container 500 may differ in structure from the neck 118 of the pharmaceutical container 100. In embodiments, an entirety of the outer surface 506 within the neck 518 is sloped inward toward the central axis CA as a function of axial position. A sloped portion 524 of the outer surface 506 at the neck 514 may extend between the shoulder 516 and an underside surface 522 of the flange 520. The outer surface 506 within an entirety of the neck 518 may be sloped inward toward the central axis CA such that an outer portion 526 (e.g., at which the radial distance $r_s$ is a maximum value $r_{max}$) of the outer surface 506 within the neck 518 (e.g., a portion of the outer surface 506 that is disposed most radially distant from the central axis CA within the neck 518) may lie at a boundary between the neck 518 and the shoulder 516 (e.g., at an end of a transition region extending between the shoulder 516 and the neck 518). In embodiments, an inner portion 528 of the outer surface 506 within the neck 518 that is a minimum radial distance $r_{min}$ from the central axis CA may lie at an upper boundary of the neck 518 (e.g., at an end of a transition region extending between the neck 518 and the underside surface 522 of the flange 520). In embodiments, the inner portion 528 is disposed closer to the central axis CA than the outer portion 526 by at least 0.1 mm (e.g., greater than or equal to 0.2 mm) to provide adequate clearance for capping tools.

The sloped portion 524 of the neck 518 may comprise a variety of forms. For example, in the depicted embodiment, the sloped portion 524 is linearly sloped such that, within the sloped portion 524, the radial distance $r_s$ between the outer surface 506 and the central axis CA continuously decreases with increasing axial distance from the shoulder 516 (e.g., with proximity to the flange 520) at a constant slope. In such embodiments, the sloped portion 524 may form a linear taper where the outer surface 506 follows a conical profile. The sloped portion 524 may extend at an angle ε relative to the central axis CA. The angle ε may be measured by a technique that is similar to that described above with respect to the angle α of FIG. 1B. In embodiments, the angle ε is greater than or equal to 0° (e.g., greater than or equal to 0.1°, greater than or equal to 0.2°, greater than or equal to 0.3°, greater than or equal to 0.4°, greater than or equal to 0.5°, greater than or equal to 1°, greater than or equal to) 2°. In embodiments, the angle ε is less than or equal to the angle α described herein with respect to FIG. 1B. Due to the greater axial extent of the sloped portion 524 as compared to the sloped portion 128 described with respect to FIGS. 1A and 1B, it has been found that the diminished angle ε may aid in maintaining the wall thickness $T_W$ greater than a threshold associated with thermal checks forming within the neck 518 during formation of the pharmaceutical container 500. Rapid cooling of relatively thin portions of the neck 518 may result in defects forming of the pharmaceutical container 500.

In embodiments, within the sloped portion 524, the radial distance $r_s$ between the outer surface 506 and the central axis CA may vary as a function of axial position in a non-uniform manner. For example, in embodiments, within at least a portion of the sloped portion 524, the radial distance $r_s$ may decrease non-linearly with increasing axial distance from the shoulder 516 such that the outer surface 506 follows a suitable curved profile. In embodiments, within at least a portion of the sloped portion 524, the outer surface 506 may extend parallel to the central axis CA or be sloped outward from the central axis CA. That is, the sloped portion 524 is not limited to any particular surface profile, provided that at least a portion of the outer surface 506 therein (e.g., disposed adjacent to the flange 520) is sloped inward towards the central axis CA.

In embodiments, the underside surface of the flange 520 of the pharmaceutical container 500 extends at a flange angle β relative to a plane extending perpendicular to the central axis CA. In embodiments, the flange angle β is greater than or equal to 5° (e.g., greater than or equal to 10°, greater than or equal to greater than or equal 20°, greater than or equal to) 30°. The flange angle β may aid the capping process described herein by facilitating adequate contact area between a metallic cap and the underside surface 522 of the flange 520 to ensure compression of a closure by the metallic cap, for example.

Figure 6:
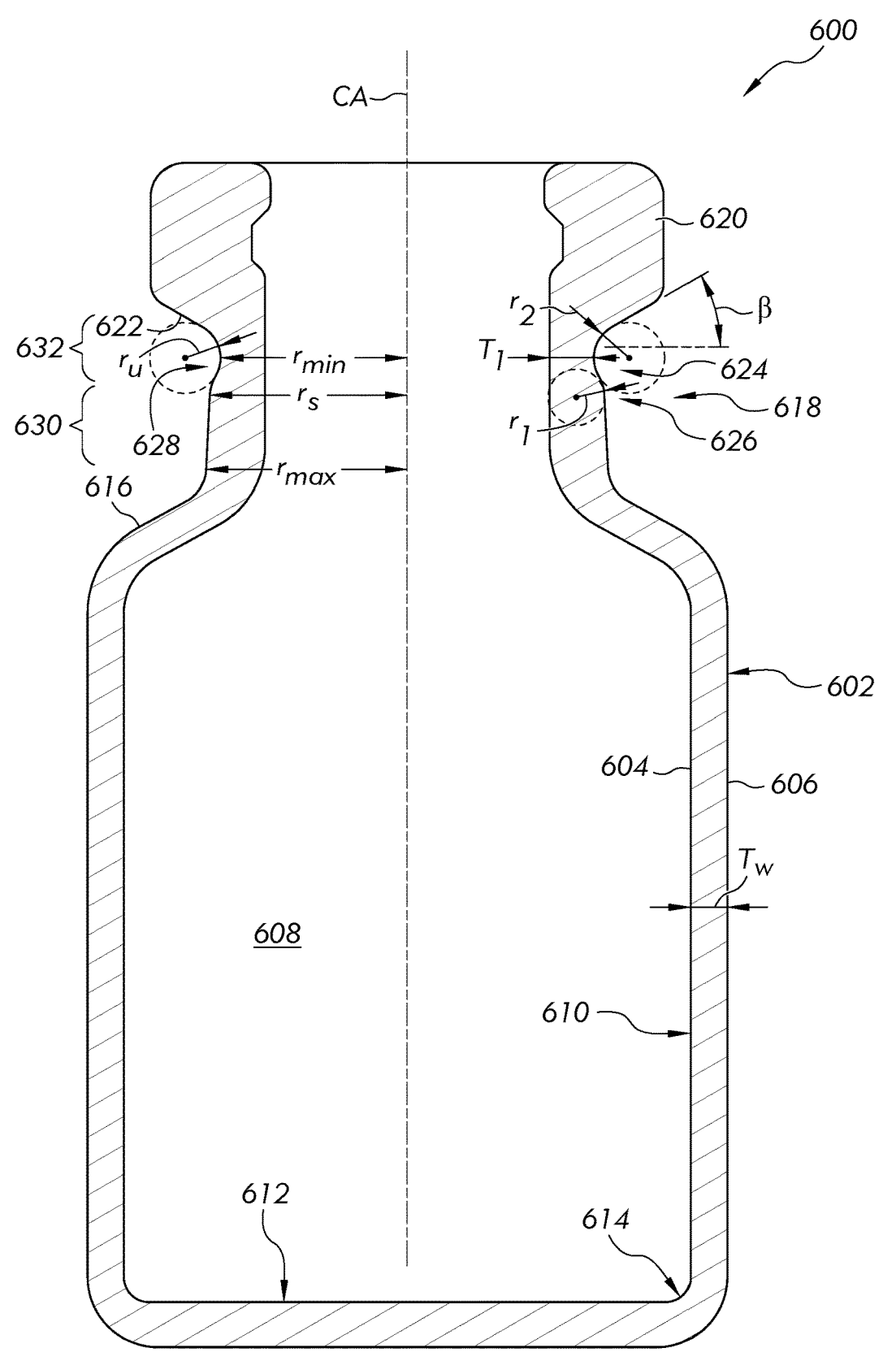
FIG. 6 schematically depicts a pharmaceutical container comprising a neck with an undercut adjacent a flange thereof, according to one or more embodiments described herein.

FIG. 6 schematically depicts a pharmaceutical container 600 for storing a pharmaceutical formulation is schematically depicted in cross section. The pharmaceutical container 600 comprises a glass body 602. The glass body 602 extends between an inner surface 604 and an outer surface 606 of the glass body 602, includes a central axis CA, and generally encloses an interior volume 608. In the embodiment of the glass body 602 shown in FIG. 6, the glass body 602 generally comprises a wall portion 610 and a floor portion 612. The wall portion 610 transitions into the floor portion 612 through a heel portion 614. In the depicted embodiment, the glass body 602 includes a flange 620, a neck 618 extending from the flange 620, and a shoulder 616. The neck 618 extends between the shoulder 616 and the flange 620. The central axis CA is orthogonal to the floor portion 612 and extends from the floor portion 612 towards the neck 618. In embodiments, the glass body 602 is symmetrical about a central axis CA. The glass body 602 has a wall thickness $T_W$ which extends between the inner surface 604 to the outer surface 606, as depicted in FIG. 6.

The pharmaceutical container 600 may be substantially similar in structure to the pharmaceutical container 100 described herein with respect to FIGS. 1A-3, with the exception that the neck 618 of the pharmaceutical container 600 may differ in structure from the neck 618 of the pharmaceutical container 100. Within the neck 618, the outer surface 606 is depicted to include an undercut 628. The undercut 628 may be a specifically shaped portion of glass material that is formed in the neck 618 as compared to other glass containers of similar size. The undercut 628 may include a negative feature (e.g. a groove, a cavity, a concave surface, or the like) within the outer surface 606 to provide clearance for capping tools to avoid contact between such capping tools and the outer surface 606 adjacent the flange 620, as described herein.

Within the undercut 628, the outer surface 606 may follow a curved contour (e.g., a circular arc in cross-section) having a radius of curvature $r_u$. In such embodiments, within the undercut 628, a radial distance $r_s$ between the outer surface 606 and the central A axis may decrease until the radial distance $r_s$ reaches a minimum value $r_{min}$.

In the depicted embodiment, the point where the radial distance $r_s$ reaches the minimum value $r_{min}$ corresponds to a point where the wall thickness $T_W$ reaches a minimum value $T_1$ within the neck 618. Within regions of the outer surface 606 of the neck 618 that are more proximate than the point where the radial distance $r_s$ reaches the minimum value $r_{min}$, the undercut 628 may slope outward and transition into an underside surface 622 of the flange 620 via a first transition region 624. In embodiments, within the first transition region 624, the outer surface 606 comprises a first radius of curvature $r_1$. In embodiments, $r_1$ corresponds to the radius of curvature $r_u$ of the undercut 628 such that that the outer surface 606 follows a circular arc extending between the neck 618 and the flange 620. Such an embodiment may simplify the shape of the forming tools needed to form the pharmaceutical container 600, in accordance with the forming methods described herein with respect to FIGS. 7-10C.

In embodiments, the inner surface 604 may be shaped differently than shown in FIG. 6 such that the wall thickness $T_W$ does not reach the minimum value $T_1$ at the point where the radial distance $r_s$ reaches the minimum value $f_{min}$. In embodiments, the minimum value $r_{min}$ may be at least 0.1 mm (e.g., at least 0.2 mm) less than the maximum value radial distance $r_s$ within the first portion 630. At such a section, the outer surface 606 may be disposed at least 0.2 mm closer to the central axis CA than in locations outside of the undercut 628 (e.g., within the first portion 630 described herein).

In embodiments, the outer surface 606 comprises a first portion 630 extending from the shoulder 616 and a upper portion 632. The upper portion 632 includes the undercut 628. As such, within the upper portion 632, the outer surface 606 follows a variable profile such that at least a portion of the outer surface 606 therein is sloped inward toward the central axis CA with increasing axial distance from the shoulder 616. In embodiments, within the upper portion 632, the outer surface 606 comprises a variable curvature such that a radius of curvature thereof varies as a function of axial position. In embodiments, within the first portion 630, the outer surface 606 extends parallel or substantially parallel (e.g., within 2° of parallel) to the central axis CA. In embodiments, within the first portion 630, the outer surface 606 is substantially cylindrical-shaped to facilitate conforming contact with capping tools to distribute contact forces over a contact area and reduce the probability of defect formation. In embodiments, within at least a portion of the first portion 630, the radial distance $r_s$ between the central axis CA and the outer surface 606 is a maximum value $r_{max}$ within the neck 618. In embodiments, the radial distance $r_s$ is the maximum value $r_{max}$ throughout an entirety of the first portion 630.

The outer surface 606 comprises a second transition region 626 demarcating a boundary between the first portion 630 and the upper portion 632. In embodiments, the second transition region 626 comprises a point where the outer surface 606 transitions from extending parallel to the central axis CA to being sloped radially inward towards the central axis CA (e.g., within the undercut 628). Within the second transition region 626, the outer surface 606 may comprise a second radius of curvature $r_2$. In embodiments, a magnitude of the second radius of curvature $r_2$ is greater than a magnitude the first radius of curvature r of the outer surface 606 within the first transition region 624. A lesser radius of curvature of lesser magnitude within the first transition region 624 beneficially reduces material that may contact stress concentrating features (e.g., corners) of capping tools.

In embodiments, the second transition region 626 is disposed at least 1.0 mm (e.g., at least 2.0 mm, at least 3.0 mm) beneath (e.g., in a direction parallel to the central axis CA) the first transition region 624. Such a clearance beneficially displaces areas of contact between the outer surface 606 and capping tools to regions that may be covered by protective coatings and/or observed via defect detection sensors. In embodiments, the axial extent of the undercut 628 is at least 1 mm. The outer surface 606 may follow a curved profile comprising one or more radii of curvature over an axial distance that is greater than or equal to 1.0 mm to provide clearance for capping tools. In embodiments, any combination of radii of curvature may be used within the undercut 628 such that, within the undercut 628, the outer surface 606 may follow a variety of different forms. In embodiments, within the undercut 628, at least a portion of the outer surface 606 is linearly sloped or extends parallel to the central axis CA. In embodiments, within the undercut 628, the outer surface 606 may not be continuously curved.

Figure 7:
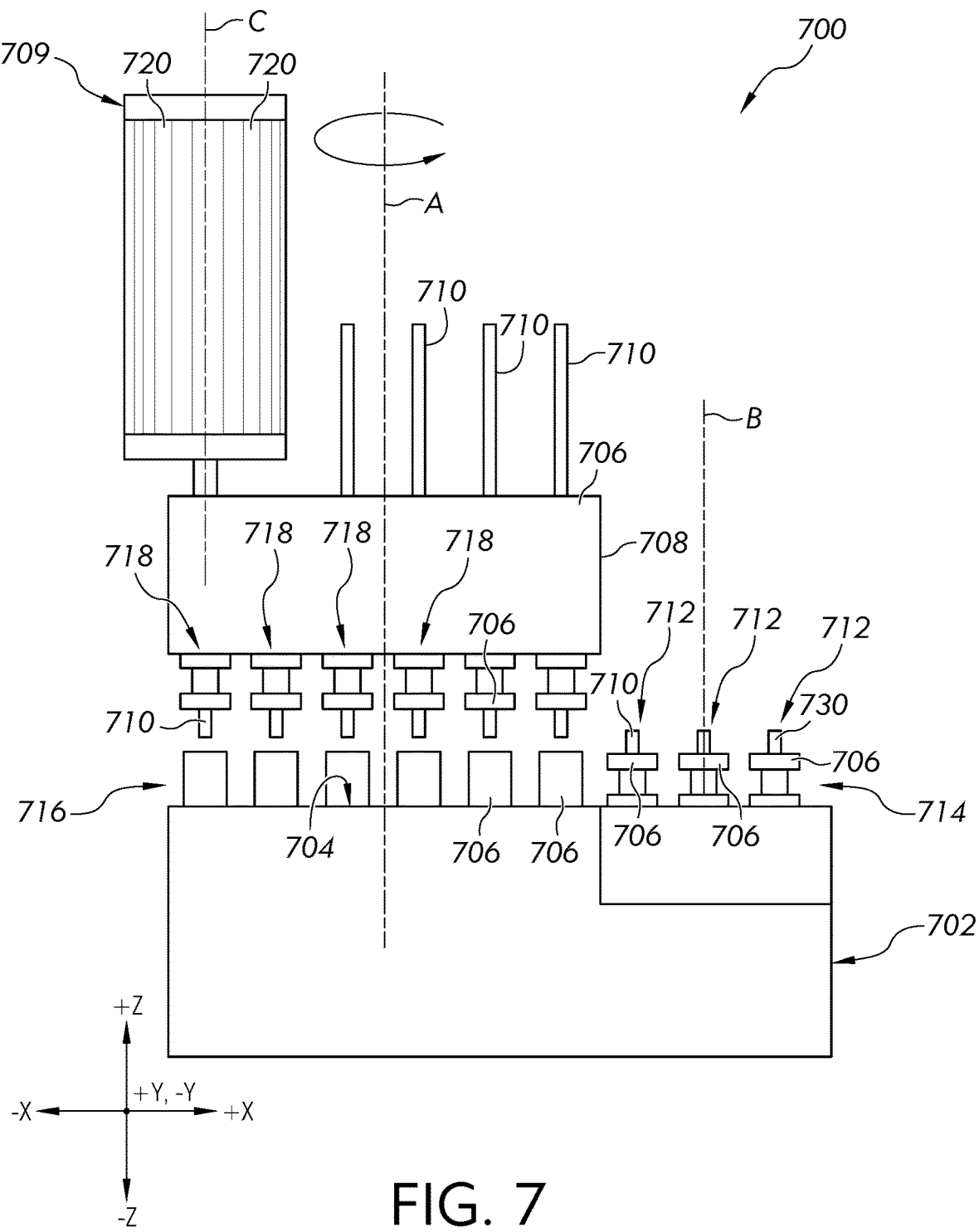
FIG. 7 schematically depicts an embodiment of a converter for producing glass articles from glass tube, according to one or more embodiments shown and described herein.

FIG. 7 schematically depicts an example converter 700 for producing glass articles from glass tubes 710. The converter 700 may be used to convert glass tubes 710 into a plurality of glass articles, such as, but not limited to, vials, syringes, cartridges, ampoules, or other glass articles. The converter 700 comprises a base 702 having a plurality of processing stations 706 spaced apart in a circuit and a main turret 708 spaced apart from the base 702 and moveable relative to the base 702. At least one of the processing stations 706 comprises one or more forming tools shaped for forming glass containers including necks with the sloped portions described herein. The main turret 708 comprises a plurality of holders 718 extending from the main turret 708 towards the plurality of processing stations 706. The plurality of holders 718 are spaced apart from one another, and each of the plurality of holders 718 is aligned with one of the plurality of processing stations 706. The main turret 708 is operable to index each of the plurality of holders 718 into proximity with each of the plurality of processing stations 706 in succession.

In embodiments, the main turret 708 is rotatable relative to the base 702 about a central axis A. A glass tube loading turret 709 is positioned above the main turret 708 for feeding glass tubes 710 to the main turret 708. The converter 700 may also include a plurality of secondary processing stations 712 on the base 702 and a secondary turret 714, which is rotatable relative to the base 702. As schematically depicted in FIG. 7, the base 702 of the converter 700 is stationary and the processing stations 706 may be coupled to an upper portion 704 of the base 702. The plurality of processing stations 706 are spaced apart from one another and arranged in a main circuit 716. In one or more embodiments, the main circuit 716 may be circular so that the main turret 708 may index a glass tube 710 through the plurality of processing stations 706 by rotation of the main turret 708 about the central axis A. The type and/or shape of the article to be made from the glass tube 710 may influence the number of processing stations 706 coupled to the base 702. The number of processing stations 706 of the main turret 708 may be from 14 processing stations 706 to 32 processing stations 706. Although the converter 700 and converting process are described herein in the context of a converter 700 having sixteen processing stations 706 in the main circuit 716, it is understood that the converter 700 may have more or less than sixteen processing stations 706 in the main circuit 716. The processing stations 706 may include, by way of example and without limitation, one or more heating, forming, polishing, cooling, separating piercing, measuring, feeding, or discharge stations or other processing stations for producing the glass articles from the glass tubes 710. The type and/or shape of the article to be made from the glass tube 710 may also influence the type of processing stations 706 and/or order of processing stations 706 of the converter 700.

The main turret 708 may be positioned above the base 702 and may be rotatably coupled to the base 702 so that the main turret 708 is rotatable about the central axis A relative to the base 702. A drive motor (not shown) may be utilized to rotate the main turret 708 relative to the base 702. The main turret 708 includes a plurality of holders 718, which are configured to removably secure each glass tube 710 to the main turret 708. The holders 718 may be clamps, chucks, or other holding devices, or combinations of holding devices. The holders 718 may orient each glass tube 710 so that the glass tube 710 is generally parallel to the central axis A of the main turret 708 and generally perpendicular to the upper portion 704 of the base 702. Although the converter 700 is described in this specification in the context of a vertically oriented converter 700, it should be understood that the converter 700 may be oriented horizontally or at an angle. Each of the holders 718 extend from a bottom portion of the main turret 708 in a direction towards the base 702 (i.e., in the −Z direction relative to the coordinate axis in FIG. 7), and each holder 718 is oriented to position the glass tube 710 in or proximate to each of the successive processing stations 706 of the main circuit 716 of the base 702 as the main turret 708 is indexed about the central axis A. Vertical orientation of the glass tubes 710 allows a downward protruding portion of each glass tube 710 to be cycled progressively through the processing stations 706 of the main circuit 716. Each holder 718 may be individually rotatable relative to the main turret 708 about holder axis D (as shown in FIG. 9), which may be generally parallel to the central axis A of the main turret 708. Each of the holders 718 may be operatively coupled to a motor (not shown), continuous drive belt, or other drive mechanism for rotation of each of the holders 718 relative to the main turret 708. Rotation of the holders 718 allows for rotation of the glass tube 710 relative to stationary burners, forming tools, cooling nozzles, or other features of the processing stations 706.

Figure 8:
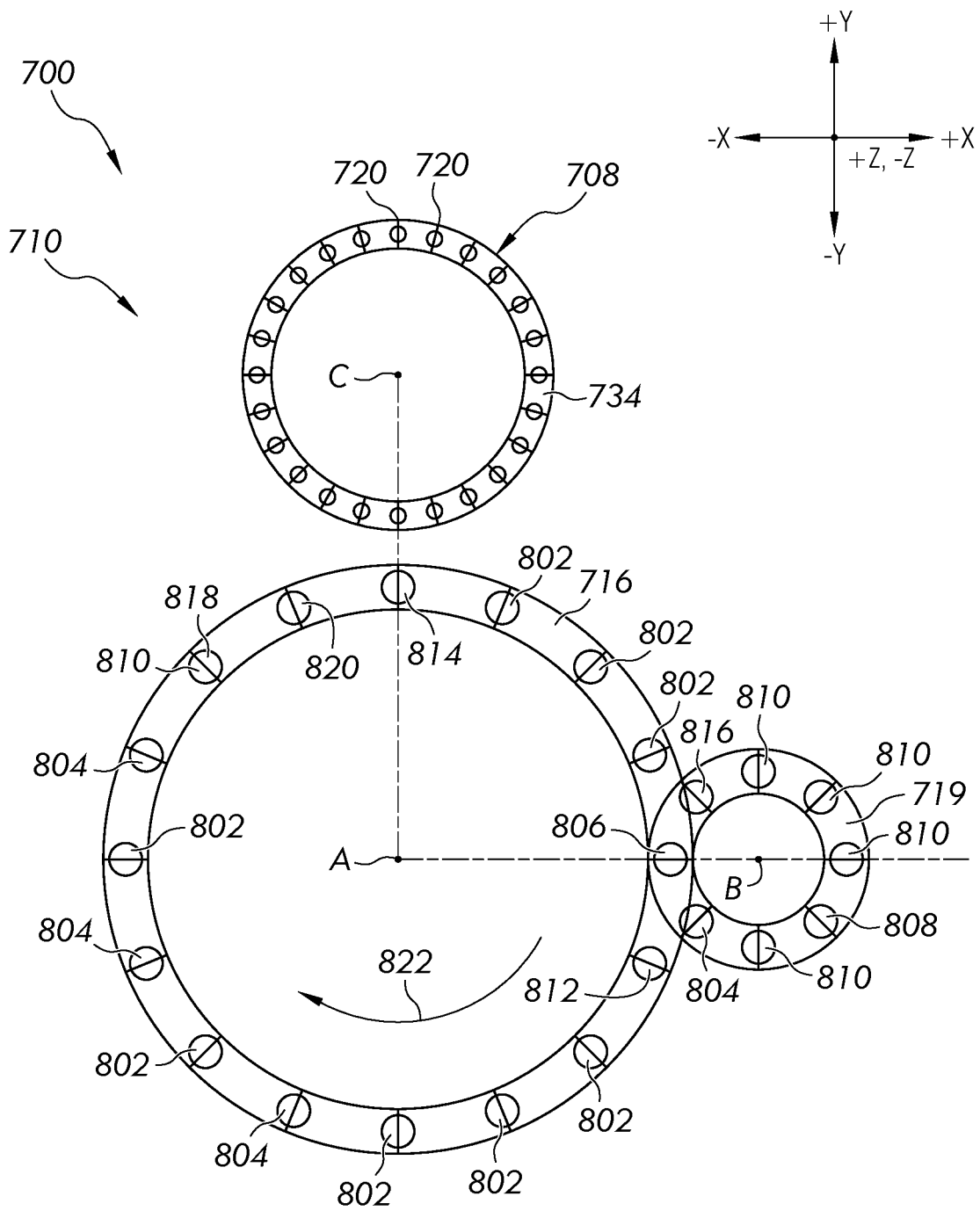
FIG. 8 schematically depicts a main turret, secondary turret, and feed turret of the glass tube converting machine of FIG. 7, according to one or more embodiments shown and described herein.

Referring to FIGS. 7-8, the converter 700 may have a plurality of secondary processing stations 712, which are also spaced apart and arranged in a secondary circuit 719 (FIG. 8), and a secondary turret 714 (FIG. 7) for indexing workpieces 730 (FIG. 7) which has been separated from the glass tube 710, through the plurality of secondary processing stations 712. The secondary turret 714 may be rotatable about a second axis B relative to the base 702. The second axis B may be generally parallel to central axis A of the main turret 708. The secondary turret 714 also includes a plurality of holders 718 to hold the workpieces 730 and position the workpieces 730 to engage with each of the secondary processing stations 712 in succession. The secondary turret 714 may receive the workpieces 730 from a separating station 806 (FIG. 8) of the main turret 708, index the workpieces 730 through the plurality of secondary processing stations 712 through rotation of the secondary turret 714, and discharge the finished articles from the converter 700.

The glass tube loading turret 709 is positioned above the main turret 708. In embodiments, the glass tube loading turret 709 may be offset from the central axis A of the main turret 708. The glass tube loading turret 709 may be rotatable about an axis C, which may be generally parallel to the central axis A of the main turret 708. The glass tube loading turret 709 may be independently supported in a stationary position relative to the main turret 708, and rotation of the glass tube loading turret 709 may be independent of the rotation of the main turret 708. Referring to FIGS. 7 and 8, in some embodiments, the glass tube loading turret 709 may include a plurality of loading channels 720 arranged in a circular circuit 734 and configured to hold glass tubes 710. The glass tube loading turret 709 may be positioned to orient one of the loading channels 720 into vertical alignment (i.e., aligned in a direction parallel to the central axis A of the main turret 708 and/or parallel to the Z axis of FIG. 7) with a processing station 706 of the main circuit 716 of the converter 700 and the corresponding holders 718 on the main turret 708 that are indexed through the processing station 706 of the main circuit 716. In one or more embodiments, the processing station 706 aligned with the glass tube loading turret 709 may be a tube loading station 814 (FIG. 8). When the converter 700 has converted all or a portion of the glass tube 710 at a specific holder position into one or more workpieces 730, the glass tube loading turret 709 may deliver a new length of glass tube 710 through the top of the main turret 708 to the holder 718 at the holder position, when the holder position indexes into alignment with the tube loading station 814 of the main circuit 716. In alternative embodiments, the converter 700 may include an arm (not shown) electromechanically movable between the main turret 708 and the glass tube loading turret 709. When the converter 700 has converted all or a portion of the glass tube 710 at a specific holder position, the arm may grab a new length of glass tube 710 from the glass tube loading turret 709 or other glass tube staging device and deliver the new length of glass tube 710 to the main turret 708 at a specific holder position. Other methods of delivery new lengths of glass tube 710 to the main turret 708 are contemplated.

Referring to FIG. 8, as previously described, the plurality of processing stations 706 of the converter 700 may include one or more heating stations 802, forming stations 804, separating stations 806, polishing stations 808, cooling stations 810, piercing stations 812, tube loading stations 814, discharge stations 816, measuring stations 818, tube length drop stations 820, or other stations and/or combinations of these stations. FIG. 8 schematically depicts the arrangement of the processing stations 706 for a converter 700 having a main circuit 716 of sixteen processing stations 706 and a secondary circuit 719 of eight secondary processing stations 712. As described, the processing stations 706 of the main circuit 716 are evenly spaced apart and evenly distributed about a circular circuit and the secondary processing stations 712 of the secondary circuit 719 are also evenly spaced apart and evenly distributed about a circular circuit. In FIG. 8, the glass tube loading turret 709 is shown in a position spaced apart from the main circuit 716 for purposes of illustration. Although the glass tube loading turret 709 is depicted as having twenty-four loading channels 720, it is understood that the glass tube loading turret may have more or less than twenty-four loading channels 720.

With respect to the direction of indexing 822 of the main turret 708, the heating stations 802 may be positioned before the separating stations 806 and each of the forming stations 804 to preheat target regions of the glass tube 710 to a target temperature at which the target region of the glass tube 710 becomes plastically deformable and may effectively be shaped or cut without cracking or shattering the glass. At the separating station 806, the formed workpiece 730 (FIG. 7) may be separated from the glass tube 710 (FIG. 7). The separating station 806 may also be the processing station at which the partially formed workpiece 730, once separated, is transferred to the secondary turret 714 (FIG. 7). The piercing station 812 may be positioned on the main circuit 716 downstream of the separating station 806 in the direction of indexing 822 of the main turret 708. At the piercing station 812, an end of the glass tube 710 previously closed by the separating station 806 is pierced, thereby forming an opening in the glass tube 710.

The forming stations 804 of the main turret 708 may be positioned downstream of the piercing station 812 in the direction of indexing 822. At the forming stations 804, the glass tube 710 is iteratively shaped into the desired shape of the finished glass article. As noted above, one or more heating stations 802 may be positioned before each of the forming stations 804 to preheat target regions of the glass tube 710 to a temperature at which the glass tube may be formed. The forming stations 804 of the main turret 708 shape one end of the workpieces 730, and the forming stations 804 of the secondary turret 714 shape the other end of the workpieces 730. In one or more embodiments, the converter 700 may be used to produce vials from the glass tubes 710, and the forming stations 804 of the converter 700 may include one or more shoulder forming stations, one or more flange forming stations, and one or more flange finishing stations, with one or more heating stations 802 positioned before and between each of the forming stations 804. The main circuit 716 may further include a measuring station 818, at which a dimensioning system may be used to measure one or more dimensions of the glass tube 710, such as the diameter and thickness for example, and one or more dimensions of the features formed by the forming stations 804. Feature dimensions may include flange thickness, flange length, neck length, neck thickness, overall article length, other feature dimension, or combinations thereof. The measuring station 818 may be positioned directly after the last forming station 804 so that the dimensions are measured while the glass tube 710 is still at elevated temperature. Alternatively, the measuring station 818 may be positioned after one or more cooling stations 810 to measure the dimensions of the glass tube 710 and/or glass article at a lower temperature.

Still referring to FIG. 8, one or more cooling stations 810 may be positioned after the forming stations 804 in the direction of indexing 822 of the main turret 708. A tube length drop station 820 may be positioned after the forming stations 804, between the forming stations 804 and the separating station 806, to drop the partially formed glass tube 710 down, thereby positioning the glass tube 710 for cutting to a target length at the separating station 806. The main circuit 716 may also include a tube loading station 814 for loading a new length of glass tube 710 feedstock from the glass tube loading turret 709 to the main turret 708 (FIG. 7). In one or more embodiments, the tube loading station 814 may be incorporated into a cooling station 810. The tube loading station 814 may be positioned between the last forming station 804 and the separating station 806.

The forming stations 804 of the main turret 708 form features at a first end of the workpiece 730. For example, the forming stations 804 may form a shoulder, neck and flange at the top (first end) of a workpiece 730 that is a vial or cartridge. Once the workpiece 730 is separated from the glass tube 710 at the separating station 806, the workpiece 730 is transferred to the secondary processing stations 712 of the secondary turret 714. The secondary processing stations 712 may include one or more forming stations 804 for forming a second end of the workpiece 730, which is opposite the first end of the workpiece 730. For example, the forming stations 804 of the secondary processing stations 712 may form one or more features at a bottom (second end) of the workpiece 730 that is a vial.

The secondary processing stations 712 of the secondary circuit 719 may include one or more heating stations 802, forming stations 804, polishing stations 808, cooling stations 810, discharge stations 816, or other stations or combinations of secondary processing stations 712. In one or more embodiments, the secondary processing stations 712 of the secondary circuit 719 may be used to form one or more features of the workpiece 730, such as a vial, ampoule, cartridge, or syringe, for example, at an end of the workpiece 730 opposite the end formed by the main turret 708. For example, in some embodiments, the workpiece 730 is a vial and the forming stations 804 of the secondary circuit 719 may form the bottom of the vial. Other features are also contemplated such as those features characteristic of ampoules, cartridges, syringes, and the like. The secondary circuit 719 may include one or more polishing stations 808 to finish the surface of the glass article. The secondary circuit 719 may further include a plurality of cooling stations 810 and the discharge station 816, at which station the finished glass article may be discharged from the converter 700.

The previous description of the processing stations 706 of the main circuit 716 and the secondary processing stations 712 of the secondary circuit 719 may represent a typical converter 700 for producing vials from the glass tube 710. However, it is understood that more or fewer processing stations 706 and secondary processing stations 712 may be utilized to make vials having different shapes or other glass articles, such as cartridges, syringes, ampoules, or other glass articles. Additionally, it is understood that the processing stations 706 and secondary processing stations 712 may be arranged in any of a number of different orders and/or configurations in order to produce differently shaped glass articles.

Figure 9A:
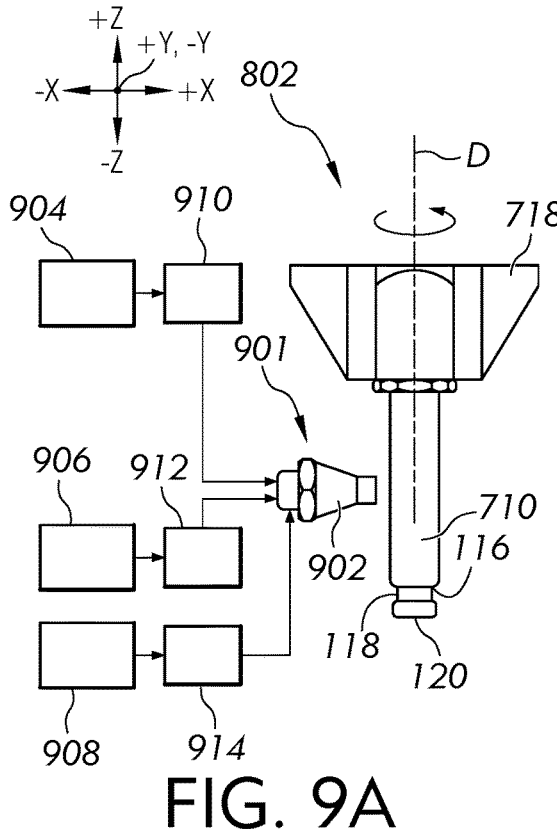
FIG. 9A schematically depicts a heating station of the converter of FIG. 7, according to one or more embodiments shown and described herein.

Referring now to FIG. 9A, a heating station 802 of the converter 700 is schematically depicted. In FIG. 9A, the glass tube 710 has been reformed to include a plurality of features, such as a shoulder 116, flange 120, and neck 118 for example, for producing the pharmaceutical container 100 described herein with respect to FIGS. 1A-3. In embodiments, the shoulder 116, flange 120, and neck 118 may formed in one or more of the forming stations 804 and 804' described herein. For example, as described herein, in embodiments, the shoulder 116 may initially be formed by the forming station 804 described with respect to FIG. 9C, while the neck 118 and flange 120 may be formed via the forming station 804' described herein with respect to FIG. 9D. Although the workpiece 730 is shown as being a vial in FIG. 9A, it is understood that the workpiece 730 could have features characteristic of an ampoule, syringe, cartridge, bottle, or other article.

As depicted in FIG. 9A, each of the heating stations 802 may include one or more heating elements 901. Examples of heating elements 901 may include, but are not limited to fuel burners, lasers such as $CO_2$ lasers for example, induction heaters, other heating devices, or combinations of these. In some embodiments, a laser in combination with one or more forming tools 924 (FIG. 9C) may be used to heat the glass tube 710 and/or control a surface temperature of the glass tube 710. As illustrated in FIG. 9A, in embodiments, the heating element 901 may include one or more burners 902, which are used to heat targeted regions of the glass tube 710 prior to a forming operation performed at the forming station 804 (FIG. 8) or separating operation performed at the separating station 806 (FIG. 8). Although FIG. 9A depicts a single burner 902, it is understood that more than one burner 902 may be employed in a single heating station 802. Each burner 902 may be fluidly coupled to a fuel supply 904, an oxygen supply 906, and, optionally, an air supply 908. Examples of fuels for the burner may include, but are not limited to hydrogen, hydrocarbon fuel gases such as methane, propane, and butane for example, other fuels, or combinations of these Each burner 902 may include a fuel control valve 910 to control the mass flow rate of fuel gas to the burner 902. Each burner 902 may also include an oxygen control valve 912 to control the mass flow rate of oxygen to the burner 902. Each burner 902 may further include an air control valve 914 for optionally controlling a mass flow rate of air to the burner 902. The burner 902 combusts the fuel gas in the presence of oxygen and/or air to produce a flame that heats at least the target region of the glass tube 710.

The heat of the flame generated by the burner 902 may be increased or decreased by changing the mass flow rates of fuel gas, oxygen, and air to the burner 902 and by changing the ratio of fuel gas to oxygen and/or the ratio of fuel gas to air fed to the burner 902. One or more of the fuel control valve 910, oxygen control valve 912, or air control valve 914 may be adjusted to adjust the ratio of fuel to oxygen and/or air. The burners 902 are continuously burning and the glass tubes 710 are indexed into and out of contact with the flame produced by the burners 902 by rotation of the main turret 708 and/or the secondary turret 714 to index the glass tube 710 into and out of the heating station 802. While positioned at the heating station 802, each glass tube 710 may be rotated by the holder 718 about the holder axis D relative to the burner 902 so that the glass tube 710 may be evenly heated around the circumference of the glass tube 710 in the specific regions to be formed in downstream forming stations 804 (FIG. 8).

Figure 9B:
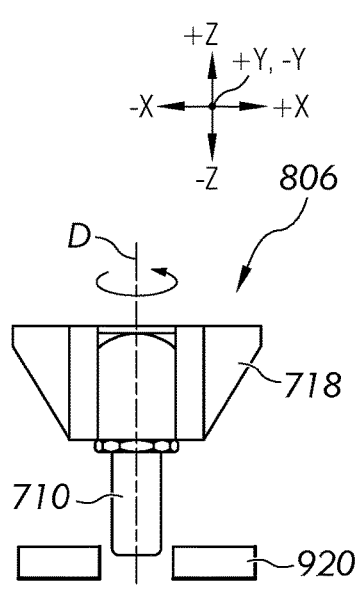
FIG. 9B schematically depicts a separating station of the converter of FIG. 7, according to one or more embodiments shown and described herein.

Referring now to FIG. 9B, a separation station 806 of the converter 700 is schematically depicted. The separation station 806 is positioned after one or more heating stations 802 in the direction of indexing 822 of the main turret 708. The heating stations 802 positioned before the separating station 806 heat the glass tube 710 to make the glass plastically deformable. The separating station 806 may include a separating tool 920. While the glass tube 710, which has been made plastically deformable by the previous heating stations 802, is rotated by the holder 718 about the holder axis D, the separating tool 920 may be engaged with the outer surface of the glass tube 710 to cut the glass tube 710 to a target length, thereby separating an workpiece 730 (FIG. 7) from the glass tube 710. Alternatively, in some embodiments, the separating station 806 may include a burner, such as a hydrogen/oxygen burner for example, and/or a laser, such as a $CO_2$ laser for example, for cutting the glass tube 710 to the target length and separating the workpiece 730 from the glass tube 710. In other embodiments, the separating station 806 may include separating tools 920 and at least one of a hydrogen/oxygen burner or a laser. Once separated from the glass tube 710, the workpiece 730 may be transferred to the secondary turret 714 (FIG. 7) or discharged from the converter 700.

Figure 9C:
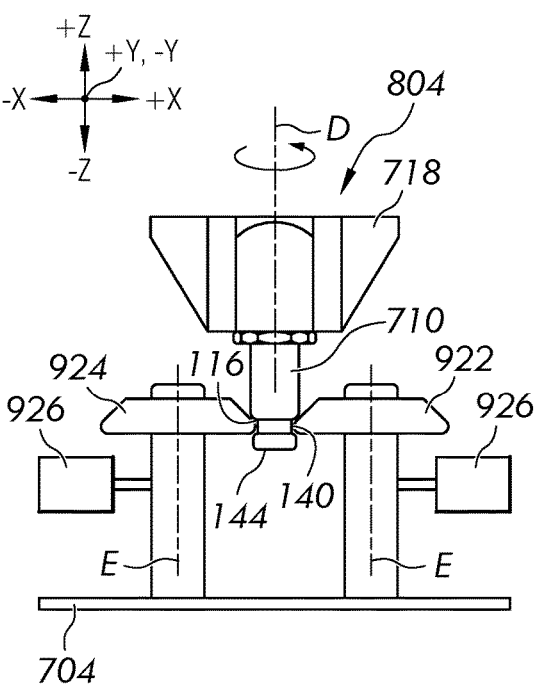
FIG. 9C schematically depicts a forming station of the converter of FIG. 7, according to one or more embodiments shown and described herein.
Figure 9C:
Figure 9D:
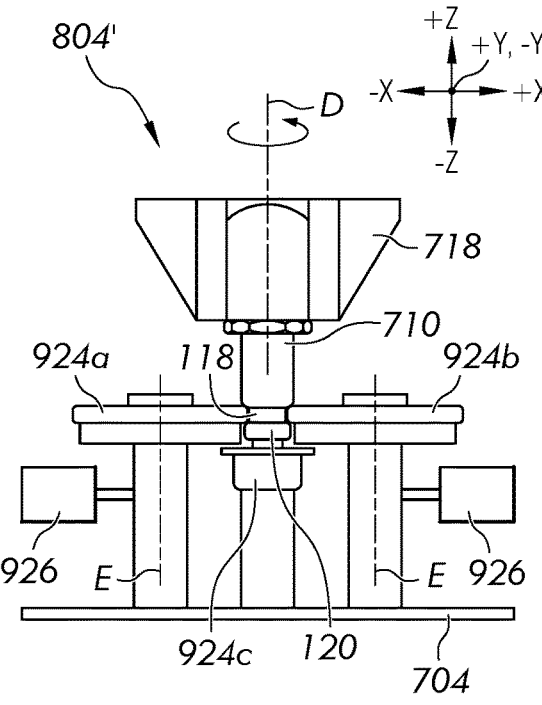
FIG. 9D schematically depicts another embodiment of a forming station of the converter of FIG. 7, according to one or more embodiments shown and described herein.

Referring now to FIGS. 9C and 9D, examples of forming stations 804 of the converter 700 are schematically depicted. FIG. 9C schematically illustrates an embodiment of a forming station 804 for forming the shoulder 116 of a glass vial formed from the glass tube 710. FIG. 9D schematically depicts an exemplary embodiment of a forming station 804' for forming the neck 118 (see FIG. 9A) and flange 120 of a glass vial formed from the glass tube 710. While the forming stations 804 and 804' for forming the shoulder 116 and flange 120 are described herein as being separate forming stations, it should be understood that the shapes of the forming tools described herein may be adapted to form such components in combination.

While the forming stations 804 and 804' are described in detail herein, it should be understood that the converter 700 may include more than two forming stations. For example, in embodiments, the converter 700 may include an additional forming station (not depicted) in the main circuit 716 after the forming station 804' described herein with respect to FIG. 9D. The additional forming station may comprise a similar set of forming tools as those described herein with respect to the forming station 804', but include a forming tool sized to fit into an opening of the glass tube 710 that is sized to more closely approximate the size of the opening than the third forming tool 924c of the forming station 804' described herein with respect to FIG. 9D. After the glass tube 710 is reworked via the forming station 804' described herein, the forming tool of the additional forming station may be inserted into the opening and the forming tool may have a tighter tolerance to the opening than the third forming tool 924c to facilitate forming an opening in the flange 120 and neck 118 having a desired geometry.

Referring to FIG. 9C, the forming station 804 comprises one or more forming tools 924 rotationally coupled to the forming station 804. The forming tools 924 may be rotatable relative to the base 702 (FIG. 7) about tooling axis E, which are generally parallel to the central axis A (FIG. 7) of the main turret 708 (FIG. 7). When indexed into the forming station 804, the glass tube 710, which has been heated in a prior heating station 802, is rotated by the holder 718. The rotatable forming tools 924 are engaged with the outer surface of the glass tube 710. The forming tools 924 may be actuated into engagement with the outer surface of the glass tube 710 by one or more actuators 926. The forming tools 924 are maintained in contact with the glass tube 710 at a tool pressure maintained by the actuators 926 for a contact time. Contact of the forming tools 924 with the outer surface of the heated glass tube 710 forms the glass tube 710 into the desired shape (e.g., to form the shoulder 116). Upon expiration of the contact time, the actuators 926 withdraw the forming tools 924 from engagement with the glass tube 710. In one or more embodiments, the contact time may be different than a dwell time of the converter 700.

Referring now to FIG. 9D, the forming station 804' for forming the flange 120 comprises three forming tools 924a, 924b, and 924c. Two of the forming tools 924a and 924b contact the outer surface of the glass tube 710 to form the outer contour of the flange 120 and the neck 118. The third forming tool 924c contacts interior surface of the glass tube 710 radially inward of the flange 120 to form the inner diameter of the glass tube 710 at the flange 120. At least a portion of the third forming tool 924c is inserted into the opening of the glass tube 710 in order to form the inner diameter of the glass tube 710 at the flange 120. The third forming tool 924c also contacts the axial end of the glass tube 710 to form the axial surface of the flange 120. In embodiments, the third forming tool 924c may be stationary and the glass tube 710 rotated about the third forming tool 924c by the holder 718. Although described relative to forming the structures of a vial, the forming stations 804 may be configured to form other structures, such as the shoulder, neck, or tapered tip of an ampoule for example, or any other structure associated with articles other than glass vials.

Figure 10A:
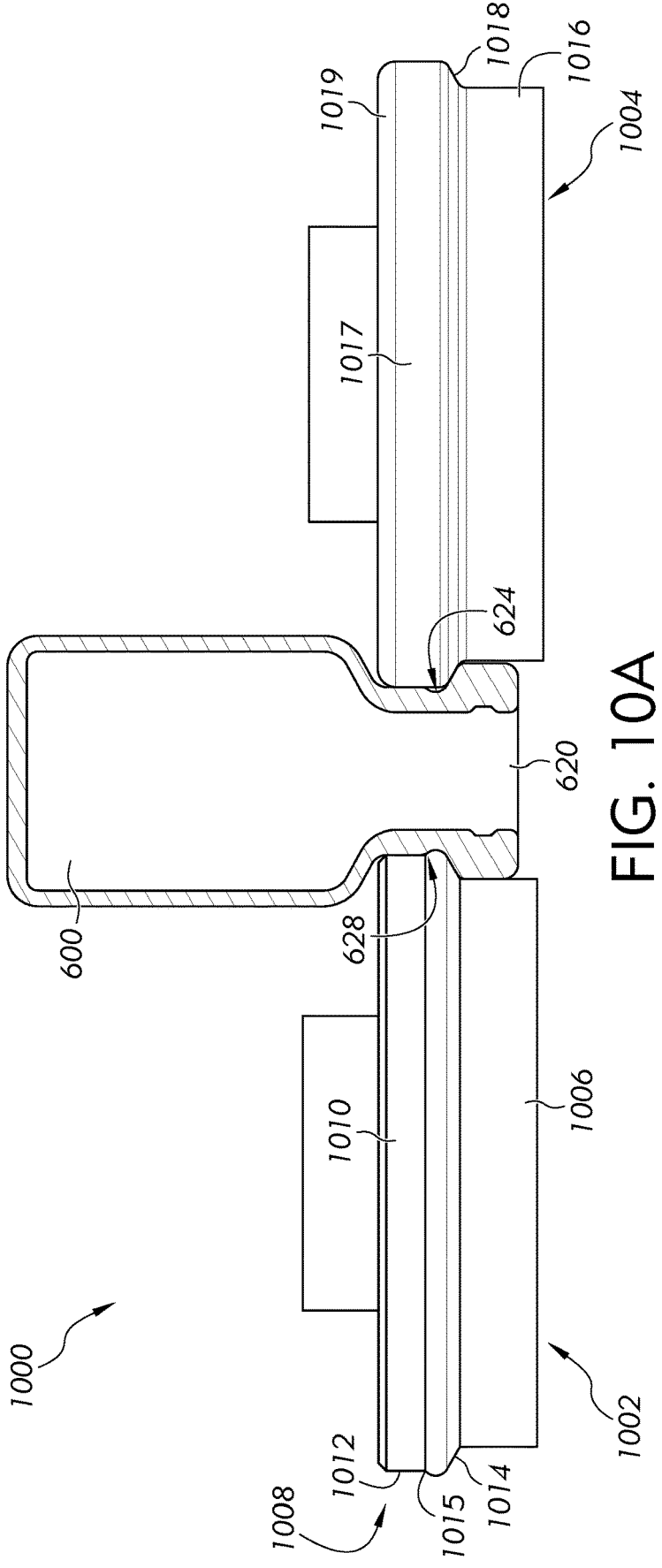
FIG. 10A schematically depicts a forming tool for use in a forming station in a process of glass tube into a pharmaceutical container comprising a neck with an undercut, according to one or more embodiments described herein.
Figure 10B:
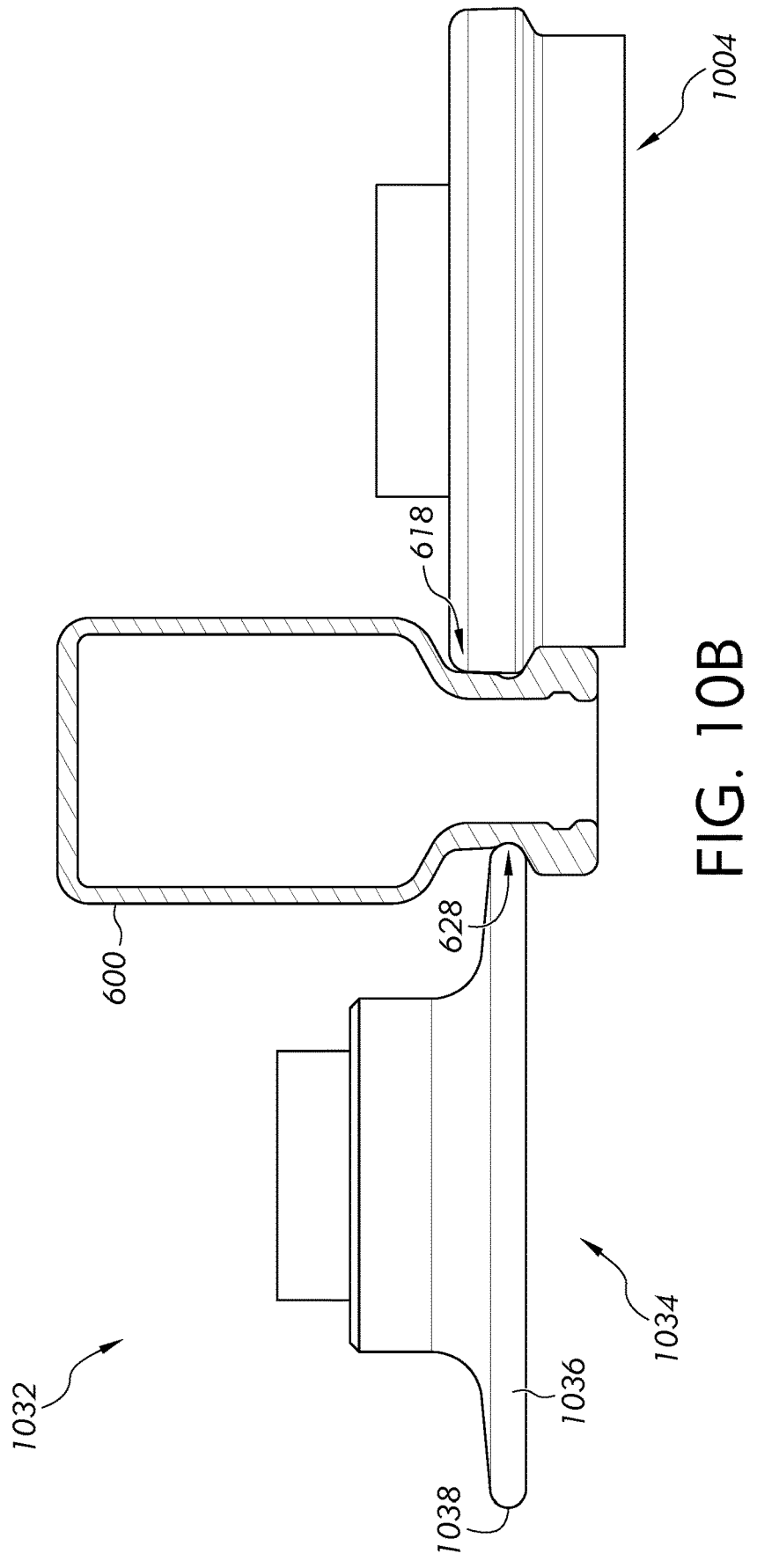
FIG. 10B schematically depicts a forming tool for use in a forming station in a process of glass tube into a pharmaceutical container comprising a neck with an undercut, according to one or more embodiments described herein.
Figure 10C:
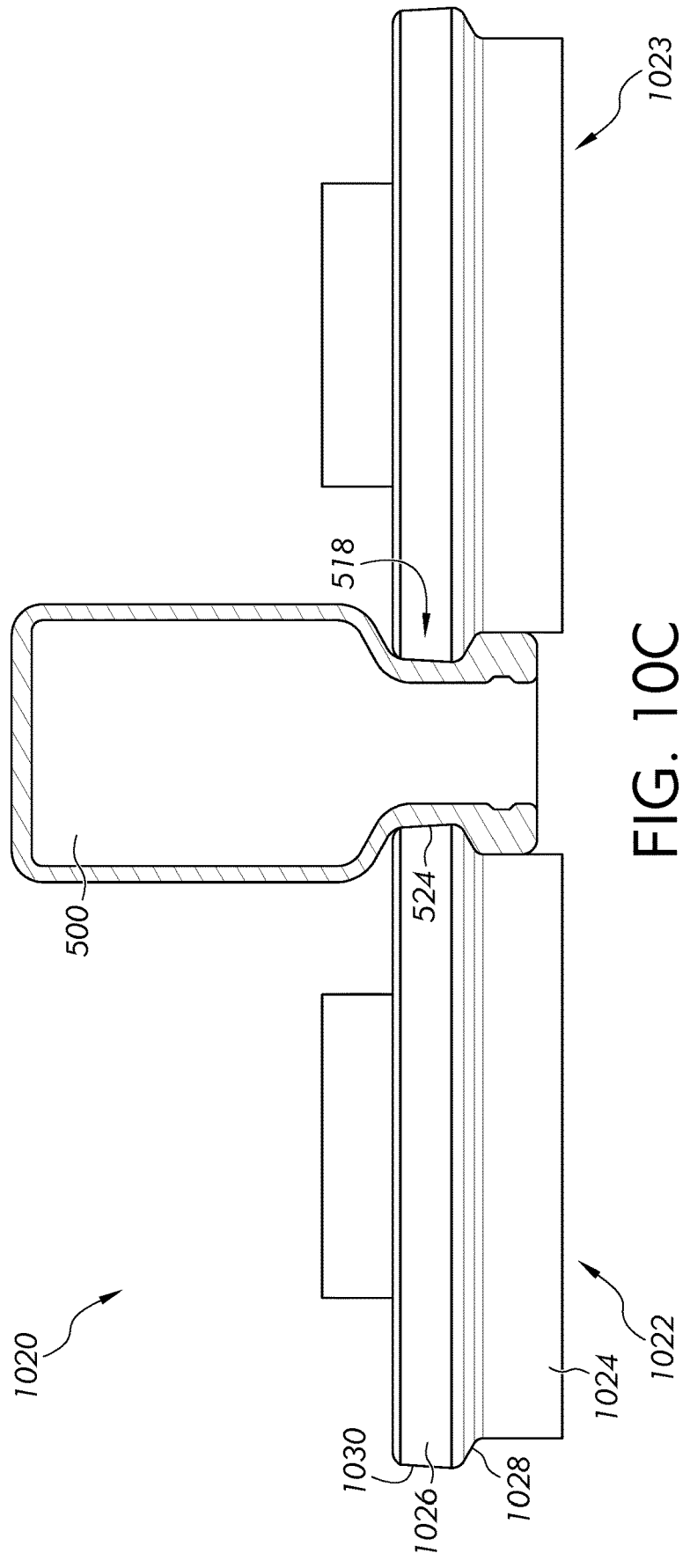
FIG. 10C schematically depicts a forming tool for use in a forming station in a process of glass tube into a pharmaceutical container comprising a neck with a sloped portion, according to one or more embodiments described herein.

In embodiments, the forming tools 924a and 924b are specifically shaped to form necks having the sloped portions described herein. FIGS. 10A-10C schematically depict forming stations 1000, 1020, and 1032 that may be used to form any of the glass containers described herein. Any of the forming tools of the forming stations 1000, 1020, and 1032 may be used in place of the forming tools 924a and 924b of the forming station 804' described herein with respect to FIG. 9D While the third forming tool 924c (see FIG. 9D) that is inserted into the opening of the glass tube 710 to form, for example, the inner surface 104 of the pharmaceutical container 100 described herein with respect to FIGS. 1A-3, is omitted from FIGS. 10A-10C, it should be understood that the forming stations 1000, 1020, and 1032 may include the third forming tool 924c having a suitable shape to form an inner diameter of a glass container.

FIG. 10A schematically depicts a forming station 1000 including forming tools 1002 and 1004 that are shaped to form the pharmaceutical container 600 described herein with respect to FIG. 6. The forming tools 1002 and 1004 may be used in place of the forming tools 924a and 924b of the forming station 804' described herein with respect to FIG. 9D to form the flange 620 and the neck 618 (see FIG. 6) of the pharmaceutical container 600. The forming tool 1002 includes a flange portion 1006 and a neck portion 1008. The flange portion 1006 may include an external peripheral shape structured to shape the outer surface 606 (see FIG. 6) at the flange 620.

The neck portion 1008 includes a forming surface 1012 that contacts the outer surface of the glass tube 710 (see FIG. 7) to shape the neck 618 into the glass tube 710 as described herein with respect to FIG. 6. At least a portion of the forming surface 1012 may extend non-parallel to the central axis CA (see FIG. 6). In the depicted embodiment, for example, the forming surface 1012 comprises a convex portion 1015 (e.g., a protrusion having a curved surface corresponding to a desired shape of the undercut 628). The neck portion 1008 also includes a upper portion 1010 extending from the convex portion 1015. Within the upper portion 1010, the forming surface 1012 may have a shape corresponding to a desired form of the first portion 630 of the outer surface 606 within the neck 618 (see FIG. 6). In embodiments, for example, the upper portion 1010 is a parallel portion extending parallel to the central axis CA (see FIG. 6).

The convex portion 1015 may include surface features that are specifically shaped to form the first transition region 624 and the second transition region 626. For example, in the depicted embodiment, the forming tool 1002 comprises a flange transition surface 1014 that is shaped to form the underside surface 622 of the flange 620 (see FIG. 6). The forming surface 1012 may be shaped to transition between the upper portion 1010 and the convex portion 1015, and between the convex portion 1015 and the flange transition surface 1014, to form the first transition region 624 and the second transition region 626 having desired radii of curvature.

The second tool 1004 includes a flange portion 1016 shaped to form the outer surface 606 within the flange 620 and a neck portion 1017 shaped to form the outer surface 606 within the neck 618. A flange transition surface 1018 be shaped to form only a portion of the underside surface 622 of the flange 620 (see FIG. 6), as the forming tool 1004 is depicted to not include a protruding feature used to form the undercut 628. As a result, the flange transition surface 1018 may not extend radially inward to the same extent as the flange transition surface 1018 of the forming tool 1002.

In embodiments, the neck portion 1017 comprises a forming surface 1019 that extends substantially parallel to the upper portion 1010 of the forming tool 1002. That is, the separation between the neck portions 1008 and 1017 of the forming tools 1002 and 1004 may vary as a function of axial position. In embodiments, once the undercut 628 is at least partially formed, a portion of the forming surface 1019 may not contact the glass tube 710 (see FIG. 7). This example demonstrates that the undercut 628 (or any of sloped region of an outer surface of a neck) may be formed by modifying only a single forming tool in a forming station of an existing converter. It should be understood that embodiments are also envisioned where the forming tool 1004 substantially corresponds in shape to the forming tool 1002 (e.g. and includes a feature similar to the convex portion 1015).

It should be understood that the convex portion 1015 may be altered in shape to form any desired surface feature within the neck 618. For example, in embodiments, the convex portion 1015 may be altered to form an inverse of the upper portion 132 of the outer surface 106 of the pharmaceutical container 100 described herein with respect to FIGS. 1A-3. In embodiments, the forming tools 1002 and 1004 may be formed via a suitable machining technique to provide forming surfaces to form desired neck profiles.

FIG. 10B schematically depicts a forming station 1032 including forming tools 1034 and 1004 that are shaped to form the pharmaceutical container 600 described herein with respect to FIG. 6. The forming tools 1034 and 1035 may be used in place of the forming tools 924a and 924b of the forming station 804' described herein with respect to FIG. 9D to form the flange 620 and the neck 618 (see FIG. 6) of the pharmaceutical container 600. In embodiments, the forming tool 1035 is the same as the forming tool 1004 described herein with respect to FIG. 10A.

The forming tool 1034 comprises a convex portion 1036 comprising a forming surface 1038 that is shaped to form the undercut 628. In the depicted embodiment, the forming tools 1034 and 1004 contact different areas of the outer surface 606 (see FIG. 6) to form the neck 618. In embodiments, for example, the forming tool 1034 may only contact a region of the glass tube 710 (see FIG. 7) corresponding to the upper portion 632 of the outer surface 606 (see FIG. 6), while the forming tool 1034 may (at least initially) contact a region of the glass tube 710 corresponding to the entire neck 618. As demonstrated by the preceding example, various different combinations of forming tools having forming surfaces of different shapes may be used to form any number of sloped portions within the neck.

FIG. 10C schematically depicts a forming station 1020 including forming tools 1022 and 1023 that are shaped to form the pharmaceutical container 500 described herein with respect to FIG. 5. The forming tools 1022 and 1023 may be used in place of the forming tools 924a and 924b of the forming station 804' described herein with respect to FIG. 9D to form the flange 520 and the neck 518 (see FIG. 5) of the pharmaceutical container 6500. The forming tool 1022 includes a flange portion 1024 and a neck portion 1026. The flange portion 1024 may include an external peripheral shape structured to shape the outer surface 506 (see FIG. 5) at the flange 520.

The neck portion 1026 comprises a forming surface 1030 that contacts the outer surface of a glass tube 710 (see FIG. 7) to form the sloped portion 524 described herein with respect to FIG. 5. The forming surface 1030 may extend non-parallel (e.g., at the angle ε) to a central axis of the glass tube 710 (see FIG. 7). A flange transition surface 1028 extends between the forming surface 1030 and the and the flange portion 1024 to form the underside surface 522 of the flange 520 (see FIG. 5). In embodiments, the forming tool 1023 substantially corresponds in shape to the forming tool 1022, such that both the forming tools 1022 and 1023 contact an entirety of the outer surface 506 during the formation of the neck 518.

FIG. 11 schematically depicts the pharmaceutical container 100 described herein with respect to FIGS. 1A-3 during a capping process, according to one or more embodiments described herein. As shown, during the capping process, a cap assembly 1100 may be engaged with the pharmaceutical container 100. The cap assembly 1100 is depicted to include a metallic cap 1108 and a stopper 1110. In embodiments, the stopper 1110 is constructed of a suitable elastomeric material (e.g., Butyl rubber) and pressed into the opening 126 (see FIG. 1A) of the pharmaceutical container 100.

In embodiments, the stopper 1110 and metallic cap 1108 are compressed against the flange via a capping system 1102. In embodiments, for example, the capping system 1102 includes a pressure block 1104 (e.g., a plunger) that applies a force to the cap assembly 1100 in a direction parallel to the central axis CA (see FIG. 1A). The force may compress the stopper 1110 such that portions of sidewalls 1112 of the metallic cap 1108 extend beyond the underside surface 122 of the flange 120. The sidewalls 1112 of the metallic cap 1108 may then be crimped to the underside surface 122 such that the stopper 1110 remains in a compressed state after removal of the force applied by the pressure block 1104. Such compression of the stopper 1110 may result in the formation of a seal between the stopper 1110 and the flange 120, thereby protecting the integrity of contained materials disposed in the interior volume 108.

As depicted in FIG. 11, the capping system 1102 may include one or more capping tools 1106 for crimping the sidewalls 1112 to the underside surface 122 of the flange 120. The one or more capping tools may take a variety of forms, depending on the implementation. For example, in embodiments, the one or more capping tools 1106 comprise capping plates that are attached to one or more actuating elements (not depicted) configured to move the one or more capping tools 1106 radially inward (e.g., towards the outer surface 106 within the neck 118) by a predetermined distance. Such movement of the one or more capping tools 1106 may bend the sidewalls 1112 of the metallic cap 1108 around the underside surface 122 of the flange 120. Residual forces within the metallic cap 1108 may retain the sidewalls 1112 in the bent position in contact with the underside surface 122 to maintain a compressive force on the stopper 1110.

In embodiments, the one or more capping tools 1106 may include a capping rail. The capping rail may comprise a circular rail comprising a contact section that extends at a decreasing angle (e.g., as a function of the angular position) relative to the underside surface 122 of the flange 120. In such embodiments, the pharmaceutical container 100 may be compressed between a base (not depicted) and the pressure block 1104. The base and pressure block 1104 may be components of a turret that rotate the pharmaceutical container 100 relative to the one or more capping tools 1106 such that the contact section bends the sidewalls 1112 against the underside surface 122. In embodiments, the one or more capping tools 1106 comprises a capping collar comprising one or more capping jaws. The capping jaws may move relative to the pressure block 1104 towards the outer surface 106 to contact the metallic cap 1108 and perform the crimping.

Irrespective of the form of the one or more capping tools 1106, the one or more capping tools 1106 comprise a contact surface 1109. The contact surface 1109 may contact the outer surface 106 within the neck 118 to ensure that a sufficiently long section of the sidewalls 1112 is bent to contact the underside surface 122. In embodiments, due to the sloped portion 128 of the outer surface 106 within the neck 118 the contact surface 1109 may not contact the neck 118 within the upper portion 132 of the outer surface 106. An uppermost area of contact between the outer surface 106 and the contact surface 1109 (e.g., an area of contact that is most proximate to the underside surface 122) may lie beneath the second transition region 136 (see FIG. 1B). In embodiments, the outer portion 138 of the outer surface 106 within the neck 118 may contact the contact surface 1109. As a result the, uppermost area of contact may be disposed at least the axial distance 140 (see FIG. 1B) from the underside surface 122 (or a lowermost point thereon). The contact surface 1109 may contact the outer surface 106 at least 1.0 mm (e.g., at least 2.0 mm, at least 3.0 mm) beneath the flange 120. As described herein, such a contact position may render defect formation less likely, as contact with the first transition region 134 may be avoided.

In embodiments, the contact surface 1109 may at least partially conform in shape to the outer surface 106 within the first portion 130. As a result, the contact between the one or more capping tools 1106 and the outer surface 106 may be distributed over an area, which may aid in reducing the probability of defect formation. As such, the sloped portion 128 of the outer surface 106 within the neck 118 may aid in avoiding contact between the capping tool 1106 and the pharmaceutical container 100 in regions that may concentrate stress (e.g., contact between a corner on the one or more capping tools 1106 and the first transition region 134). The sloped portion 128 may also displace points of contact from the underside surface 122, rendering any defects that may form more detectable. In embodiments, points of contact between the one or more capping tools 1106 and the pharmaceutical container 100 may also lie on portions of the outer surface 106 that are covered by the lubricous coating 160 (see FIG. 4), further reducing the probability of defect formation.

The capping system 1102 is only an illustrative example and it should be understood that the pharmaceutical containers herein may be used to reduce the probability of defect formation in any capping process. Moreover, any of the pharmaceutical containers described herein may be used in conjunction with the capping system 1102. The sloped portion 128 may also differ in shape from the embodiment depicted in FIG. 11 to achieve a desired defect reduction.

FIG. 12 schematically depicts a pharmaceutical container 1200 in engagement with a cap assembly 1206 during a crimping process. The pharmaceutical container 1200 may be similar in structure to the pharmaceutical container 600 described herein with respect to FIG. 6. The pharmaceutical container 1200 is depicted to include a glass body comprising an outer surface 1201. The glass body includes a neck 1204 including an undercut 1205 (e.g., similar in structure to the undercut 628 described herein with respect to FIG. 6). The pharmaceutical container 1200 further includes a flange 1226 having an underside surface 1228. A cap assembly 1206 is engaged with the pharmaceutical container 1200. The cap assembly 1206 includes a stopper 1208 and a metallic cap 1210. The stopper 1208 is inserted into an opening in the glass body. In embodiments, the stopper 1208 is compressed (e.g., via a pressure block similar to the pressure block 1104 described herein with respect to FIG. 11) such that stopper 1208 is axially compressed and portions of the metallic cap 1210 extend beyond the underside surface 1228 of the flange 1226.

A capping tool 1214 is depicted to be in contact with the metallic cap 1210. For example, the capping tool 1214 may be a cross-section of a capping rail. The pharmaceutical container 1200 may be moved relative to the capping tool 1214 such that the capping rail bends the metallic cap 1210 to form a crimped region 1212 contacting the underside surface 1228. The capping tool 1214 is depicted to include an angled surface 1220. In embodiments, the angled surface 1220 extends parallel to the underside surface 1228. A clearance 1222 is provided between the angled surface 1220 and the underside surface 1228 to provide room for the metallic cap 1210. The capping tool 1214 also includes a contact surface 1216. During the capping process, the contact surface 1216 may contact the outer surface 1201 within the neck 1204.

As a result of the undercut 1205, the contact surface 1216 may not contact the outer surface 1201 adjacent to the flange 1226. A corner extending between the angled surface 1220 and the contact surface 1216 may not contact the outer surface 1201 (but rather be disposed within the undercut 1205) when a lower portion 1218 of the contact surface 1216 contacts the outer surface 1201. In embodiments, a region of contact between the lower portion 1218 and the outer surface 1201 may lie beneath a transition region 1224 of the outer surface 1201. The transition region 1224 may be a region of the outer surface 1201 that curves inward toward a central axis of the pharmaceutical container 1200. In embodiments, the transition region 1224 may be disposed at least 1.0 mm (e.g., at least 2.0 mm, at least 3.0 mm) beneath the underside surface 1228 (or a point thereon most proximate to the neck 1204). As described herein, by avoiding points of contact between the capping tool 1214 and the outer surface 1201 adjacent the flange 1226, the undercut 1205 may beneficially reduce the probability of defect formation.

FIG. 13 schematically depicts another pharmaceutical container 1300 in contact with a capping tool 1316 in cross-section. FIG. 13 omits various components (e.g., a cap assembly, a pressure block) for the purposes of illustration). The capping tool 1316 may be disposed in a contact position where a contact surface 1320 contacts an outer surface 1304 of the pharmaceutical container 1300. The pharmaceutical container 1300 may be similar in structure to the pharmaceutical container 100 described herein with respect to FIGS. 1A-3. The pharmaceutical container includes, a neck 1306, and a flange 1308 including an underside surface 1310. As shown, within the neck 1306, the outer surface 1304 comprises a sloped portion 1314 similar to the sloped portion 128 of the pharmaceutical container 100 described herein with respect to FIG. 1A-3.

The capping tool 1316 is similar in structure to the capping tool 1214 described herein with respect to FIG. 12. The capping tool 1316 may be a capping rail. Relative motion between the capping tool 1316 and the pharmaceutical container 1300 may crimp a cap (not depicted) against the underside surface 1310. As shown, the contact surface 1320 includes a length. In embodiments, the sloped portion 1314 comprises an axial length that is greater than or equal to half of the length of the contact surface 1320. As a result a lower half of the contact surface 1320 may contact an outer portion 1318 of the outer surface 1304 within the neck 1306. As a result, no portion of the contact surface 1320 disposed axially above the outer portion 1318 may directly contact the pharmaceutical container 1300. Contact between any stress concentrating features (e.g., corners of the capping tool 1316, transition regions or areas curvature of the outer surface 1304) may be beneficially avoided to reduce probability of defect formation.

In view of the foregoing, it should be appreciated that pharmaceutical containers comprises necks with sloped portions have been shown and described. Regions of outer surfaces of the pharmaceutical containers within the neck adjacent the flange are sloped inward toward central axes thereof. Such sloped portions may take a variety of shapes, but may generally remove material from the glass container than may contact capping tools used to crimp metallic caps to the pharmaceutical containers. Regions of contact between the capping tool and the outer surfaces are beneficially displaced from the flange to avoid contact between stress concentrating features at the interfaces between the pharmaceutical containers and the capping tools. Such regions of contact may be at least 1.0 mm from the flanges to facilitate the regions of contact between the pharmaceutical containers and the capping tools being at locations of the pharmaceutical containers that are covered by a lubricous coating. As a result, any defects that may form may also be more detectable using existing inspection techniques, thereby facilitating the discarding of defective containers in the event that defects do form.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A pharmaceutical container comprising:
a glass body enclosing an interior volume of the pharmaceutical container, the glass body comprising:
a central axis extending through a geometric center of the interior volume;
a wall thickness extending between an inner surface and an outer surface, wherein outer surface comprises a first transition region extending between the neck and the underside surface, and at least a portion of the first transition region is disposed radially inward of an outer portion of the outer surface within the neck that is most radially distant from the central axis, the first transition region having a first radius of curvature;
a flange comprising an underside surface;
a shoulder; and
a neck extending between the flange and the shoulder, wherein, within at least a portion of the neck, the outer surface extends inward toward the central axis such that at least a sloped portion of the outer surface is sloped inward towards the central axis adjacent the flange, the outer surface within the neck comprises a second transition region, and in the second transition region the outer surface extends inward toward the central axis and follows a contour having a second radius of curvature that is greater than the first radius of curvature.

2. The pharmaceutical container of claim 1, wherein the outer surface extends inward towards the central axis such that the wall thickness decreases within the neck with decreasing distance from the underside surface.

3. The pharmaceutical container of claim 1, wherein the outer portion of the outer surface within the neck that is most radially distant from the central axis is disposed at least 1 mm beneath the underside surface of the flange.

4. The pharmaceutical container of claim 1, wherein, within the sloped portion, the outer surface extends radially inward toward the central axis by at least a radial distance of 0.2 mm.

5. The pharmaceutical container of claim 1, further comprising a lubricous coating positioned around at least a portion of the outer surface.

6. The pharmaceutical container of claim 5, wherein:
the lubricous coating is disposed on at least a portion of the outer surface at the neck, and
the outer surface extends inward toward the central axis within a region of the neck that does not comprise the lubricous coating.

7. The pharmaceutical container of claim 1, wherein, within the neck, the outer surface comprises:
a first portion extending from the shoulder; and
an upper portion extending between the first portion and the flange, wherein, within the upper portion, the wall thickness decreases with increasing distance from the shoulder.

8. The pharmaceutical container of claim 7, wherein a lower edge of the upper portion disposed at least 2.0 mm beneath the underside surface of the flange.

9. The pharmaceutical container of claim 7, wherein:
the upper portion comprises a taper, and
within the taper, the wall thickness linearly decreases with increasing distance from the shoulder.

10. The pharmaceutical container of claim 7, wherein:
the upper portion comprises an undercut, and
within the undercut, the wall thickness non-linearly decreases with increasing distance from the shoulder.

11. A method of capping a pharmaceutical container comprising:
inserting a sealing member into an opening of the pharmaceutical glass container, the pharmaceutical container comprising:
a glass body enclosing an interior volume of the pharmaceutical container, the glass body comprising:
a central axis extending through a geometric center of the interior volume;
a wall thickness extending between an inner surface and an outer surface;
a flange comprising an underside surface;
a shoulder; and
a neck extending between the flange and the shoulder, wherein, within at least a portion of the neck, the outer surface extends inward toward the central axis such that at least a sloped portion of the outer surface is sloped inward towards the central axis with adjacent flange;
sliding a cap against the flange such that a portion of the cap extends beyond the underside surface towards the shoulder; and
crimping the cap against the underside surface by pressing the portion of the cap extending beyond the underside surface against the underside surface using a capping tool, wherein the capping tool comprises an end surface that contacts the outer surface on the neck at least 1 mm beneath the underside surface of the flange.

12. The method of claim 11, wherein the end surface of the capping tool contacts the outer surface over a contact area that is displaced from the underside surface of the flange.

13. The method of claim 11, wherein the pharmaceutical container comprises a lubricous coating covering at least a portion of the outer surface.

14. The method of claim 13, wherein the end surface only contacts portions of the neck that are covered by the lubricous coating.

15. The method of claim 11, wherein the capping tool comprises:
an angled surface that extends parallel to the underside surface of the flange during the crimping, and
a corner extending between the end surface and the angled surface.

16. The method of claim 11, wherein, within the sloped portion, the outer surface within the neck extends inward towards the central axis such that the wall thickness decreases within the neck with decreasing distance from the underside surface.

17. The method of claim 11, wherein:

the glass body comprises a transition region extending between the neck and the underside surface of the flange, and during the crimping, the capping tool does not contact the transition region.

* * * * *